US012626355B2

(12) United States Patent (10) Patent No.: US 12,626,355 B2

Haruta (45) Date of Patent: May 12, 2026

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Kenichirou Haruta, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 388 days.

(21) Appl. No.: 18/318,090

(22) Filed: May 16, 2023

(65) Prior Publication Data

US 2023/0386020 A1 Nov. 30, 2023

(30) Foreign Application Priority Data

May 30, 2022 (JP) ................................. 2022-087881

(51) Int. Cl.
*G06T 7/00* (2017.01)
*G06T 3/147* (2024.01)
*G06T 7/33* (2017.01)

(52) U.S. Cl.
CPC .............. *G06T 7/001* (2013.01); *G06T 3/147* (2024.01); *G06T 7/337* (2017.01); *G06T 2207/30144* (2013.01)

(58) Field of Classification Search
CPC ......... G06T 7/001; G06T 7/337; G06T 3/147; G06T 2207/30144; G06T 7/0002;

(Continued)

(56) References Cited

U.S. PATENT DOCUMENTS 11,361,203 B1 * 6/2022 Topete Uribe ..... G06K 15/1868
11,665,303 B2 * 5/2023 Nakada .............. H04N 1/00037
358/3.26

(Continued)

FOREIGN PATENT DOCUMENTS

CN 119590111 A * 3/2025 ................ B41J 2/01
EP 3263040 A1 * 1/2018 ............... A61B 6/03

(Continued)

OTHER PUBLICATIONS

Chao Wang et al. "Design of Automatic Print Defect Detection System Based on Machine Vision Detection Algorithm", Jan. 2025, IEEE (Year: 2025).*

*Primary Examiner* — John Villecco
*Assistant Examiner* — Alejandro Hernandez
(74) *Attorney, Agent, or Firm* — ROSSI, KIMMS & McDOWELL LLP

(57) ABSTRACT

The present invention provides an image processing apparatus that inspects an image formed on a printing medium. The image processing apparatus reads an image formed on a printing medium and obtains a target image to be inspected, and corrects a position of control point among control points disposed on the target image, at or near an edge of the printing medium, and performs alignment using the corrected position of the control point so as to align the target image to a reference image using a non-rigid-body alignment, and inspects for a defect in the target image on a basis of the aligned target image and the reference image. In the correcting, a position of a control point at or near the edge is corrected on a basis of an interval between adjacent control points at or near the edge.

22 Claims, 20 Drawing Sheets

(58) Field of Classification Search
CPC ........... G06T 7/0004; G06T 7/30; G06T 3/14;
G06T 3/40; H04N 1/00005; G06F
3/1208; G06F 3/1202; G06F 3/1201;
G06F 3/12; G06V 10/24
See application file for complete search history.

(56) References Cited

U.S. PATENT DOCUMENTS

| | | | | |
|---|---|---|---|---|
| 12,058,290 | B2 * | 8/2024 | Ichihashi | G06V 10/25 |
| 12,293,509 | B2 * | 5/2025 | Ishii | G06T 7/001 |
| 12,504,934 | B2 * | 12/2025 | Shibata | G03G 15/5062 |
| 2003/0164942 | A1 * | 9/2003 | Take | G01N 21/9501 |
| | | | | 356/394 |
| 2009/0024022 | A1 * | 1/2009 | Azar | A61K 49/1827 |
| | | | | 600/420 |
| 2013/0148987 | A1 * | 6/2013 | Arakawa | G06T 7/40 |
| | | | | 399/15 |
| 2015/0324989 | A1 * | 11/2015 | Smith | G06T 7/00 |
| | | | | 382/278 |
| 2015/0373218 | A1 * | 12/2015 | Watanabe | H04N 1/00737 |
| | | | | 358/448 |
| 2017/0082425 | A1 * | 3/2017 | Minekawa | G01N 21/956 |
| 2018/0205853 | A1 * | 7/2018 | Terada | H04N 1/405 |
| 2020/0058115 | A1 * | 2/2020 | Mimura | H04N 1/00005 |
| 2020/0111199 | A1 * | 4/2020 | Ikeda | H04N 1/00005 |
| 2020/0234422 | A1 * | 7/2020 | Esumi | G06T 7/337 |
| 2020/0234456 | A1 * | 7/2020 | Mita | G06V 10/44 |
| 2021/0274050 | A1 * | 9/2021 | Morita | H04N 1/0066 |
| 2022/0091534 | A1 * | 3/2022 | Kim | G03G 15/55 |
| 2022/0383471 | A1 * | 12/2022 | Ochiai | G06T 7/001 |
| 2023/0083271 | A1 * | 3/2023 | Yamamoto | G06T 7/0004 |
| | | | | 382/112 |
| 2023/0401695 | A1 * | 12/2023 | Shinya | G06T 7/001 |
| 2024/0029238 | A1 * | 1/2024 | Daiku | G06T 7/11 |
| 2024/0119583 | A1 * | 4/2024 | Daiku | G06T 7/337 |
| 2024/0242406 | A1 * | 7/2024 | Zhou | G06T 7/12 |
| 2024/0340380 | A1 * | 10/2024 | Ijichi | H04N 1/00005 |
| 2025/0348997 | A1 * | 11/2025 | Daiku | G06T 7/001 |

FOREIGN PATENT DOCUMENTS

| | | | | |
|---|---|---|---|---|
| JP | 2020118497 A | 8/2020 | | |
| JP | 2020162927 A | * 10/2020 | | |
| WO | WO-2025134581 A1 * | 6/2025 | | G06T 7/90 |

* cited by examiner

F I G. 4
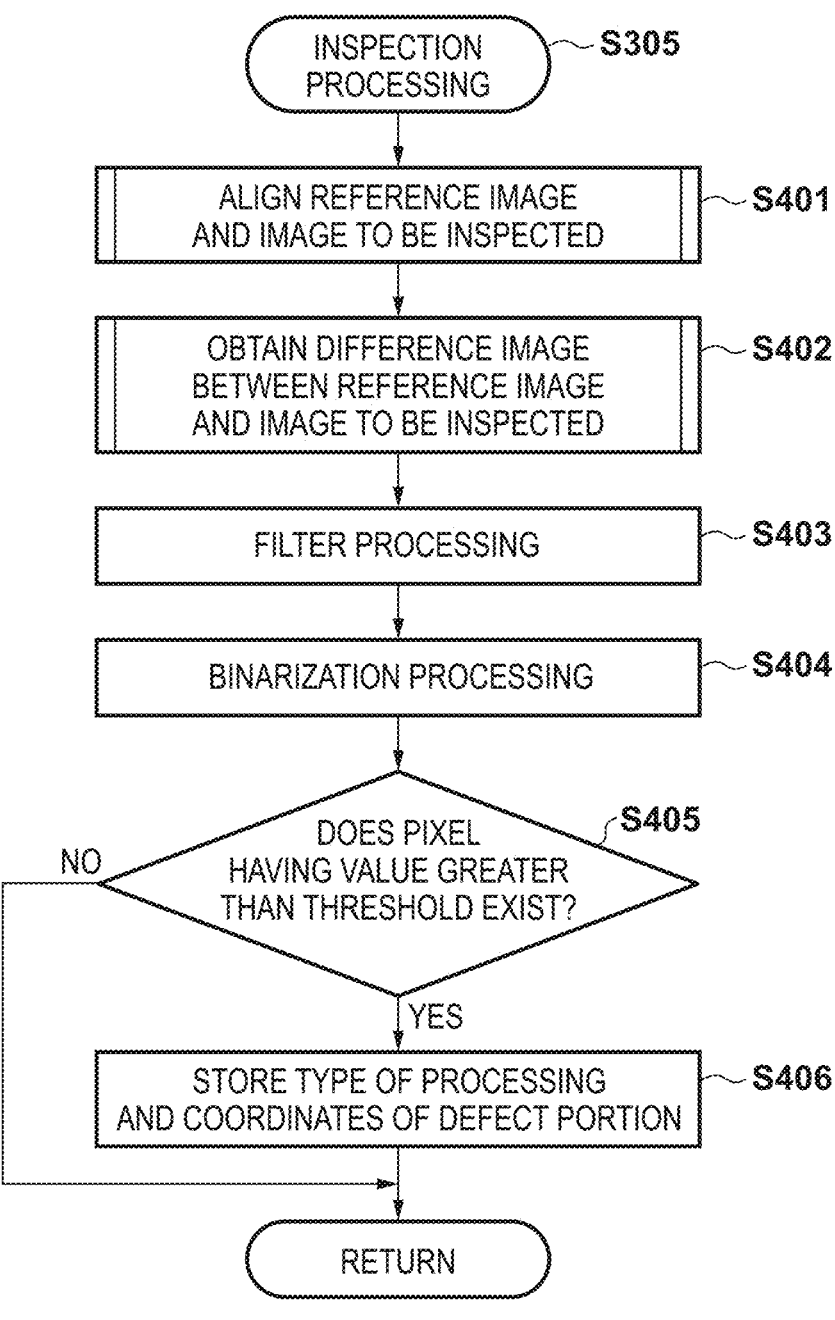

F I G. 5A
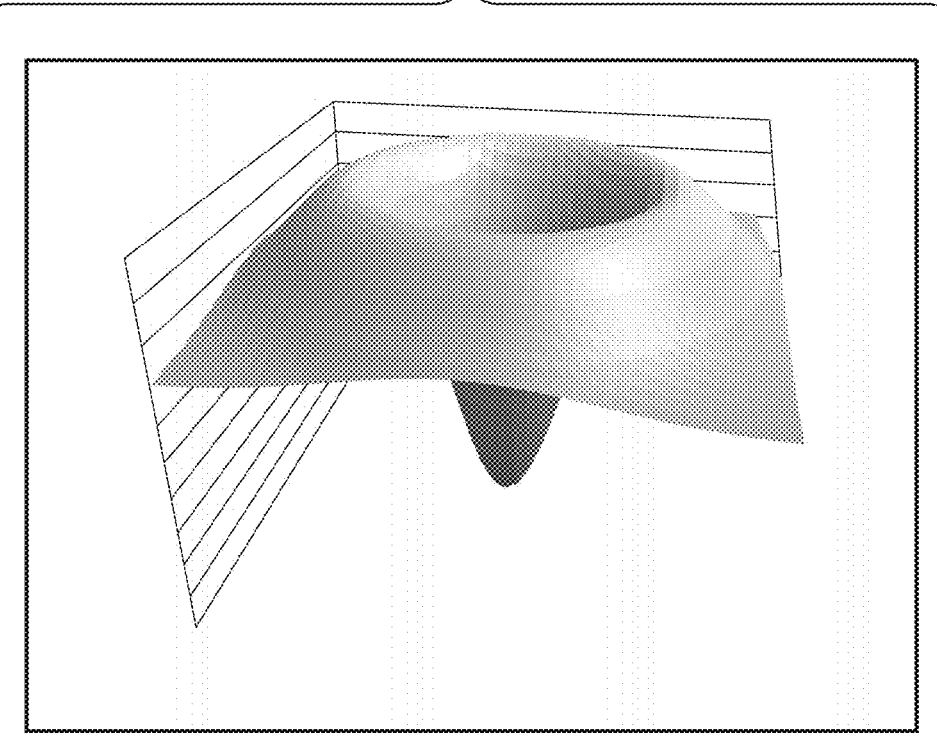
F I G. 5B
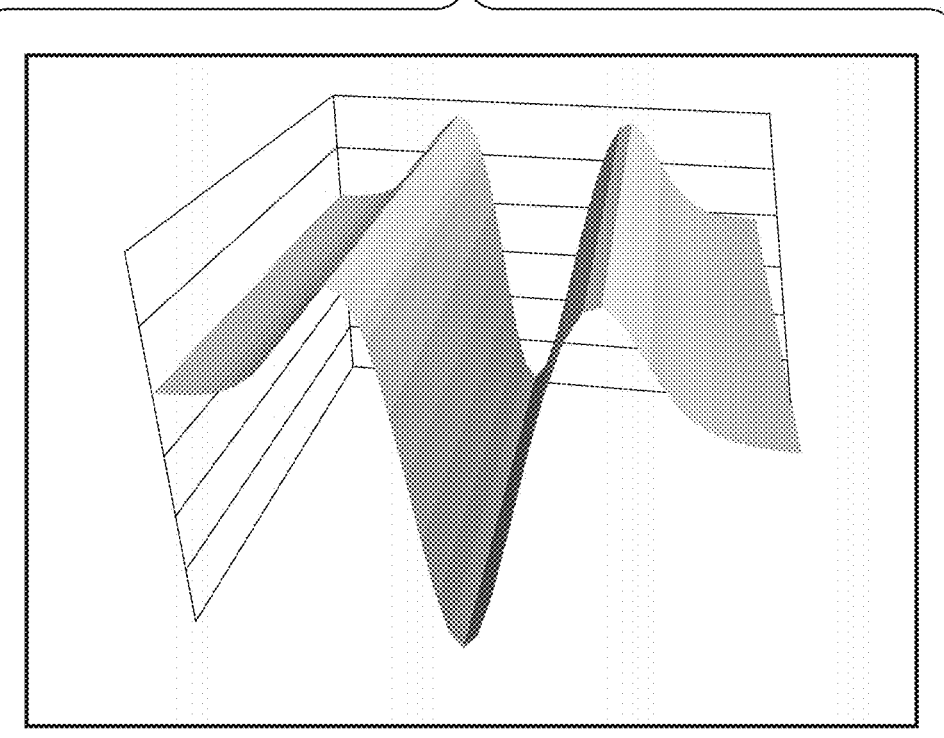

F I G. 6
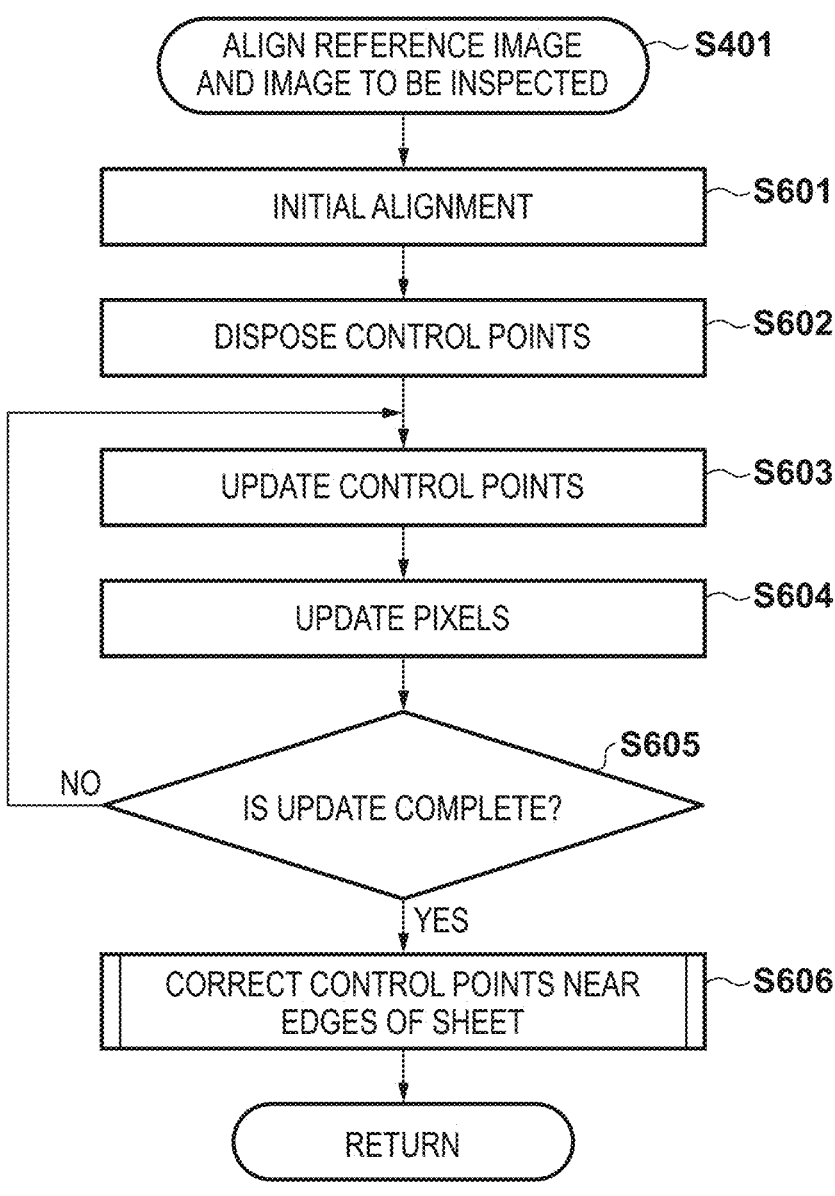

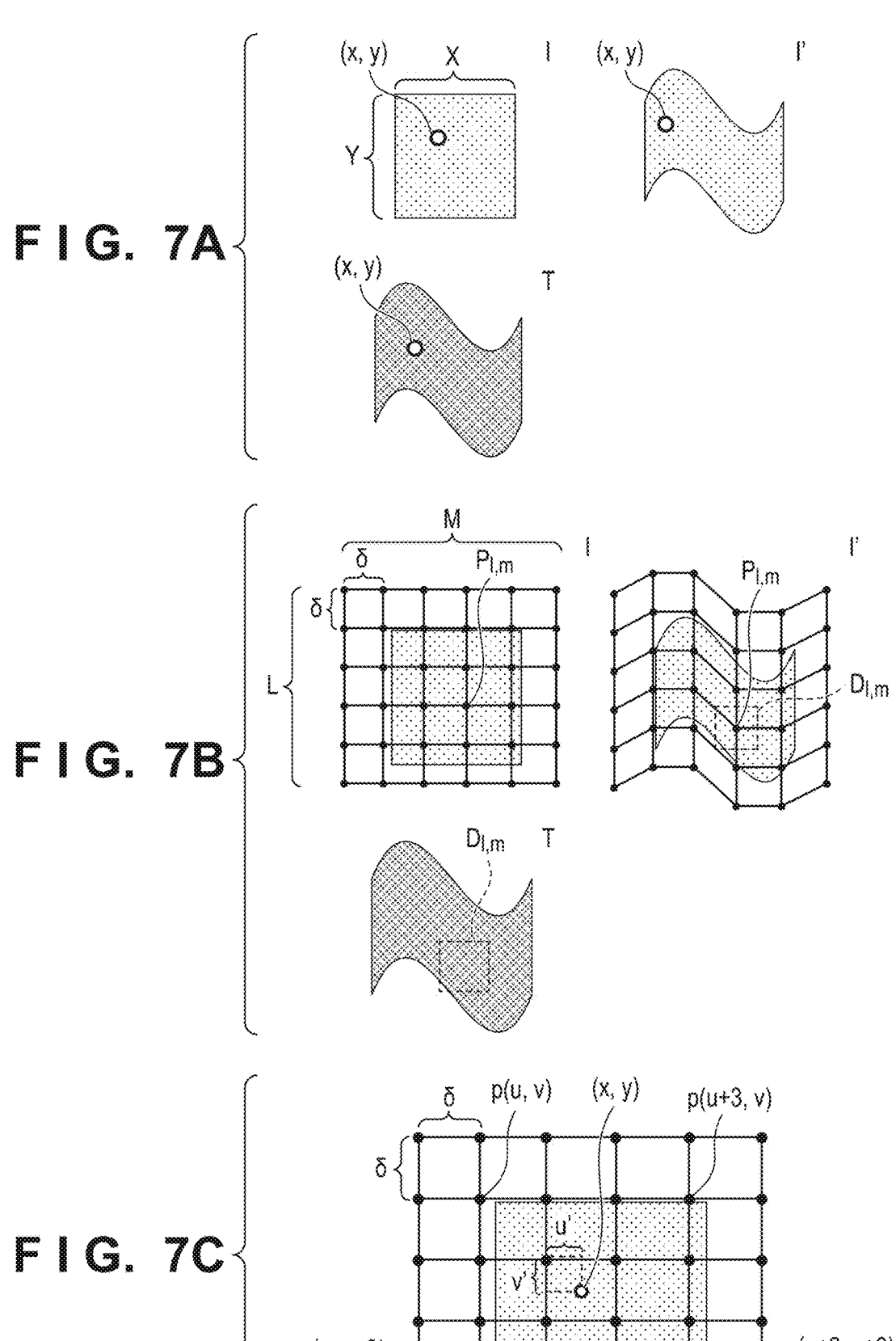
F I G. 7A
F I G. 7B
F I G. 7C

F I G. 9A
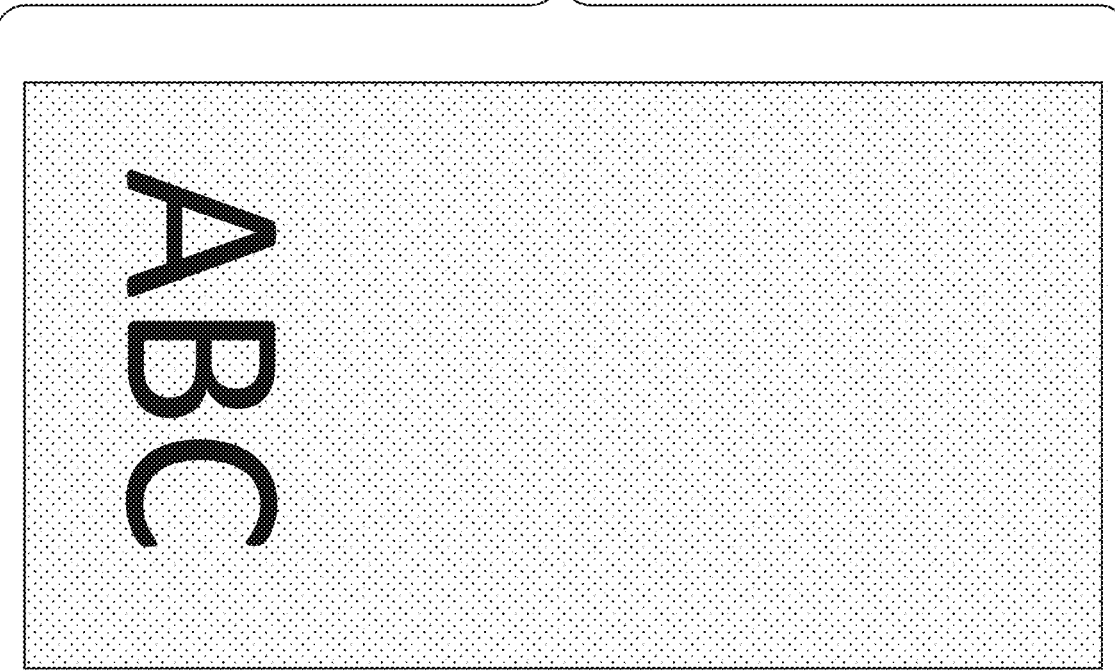
F I G. 9B

F I G. 10A
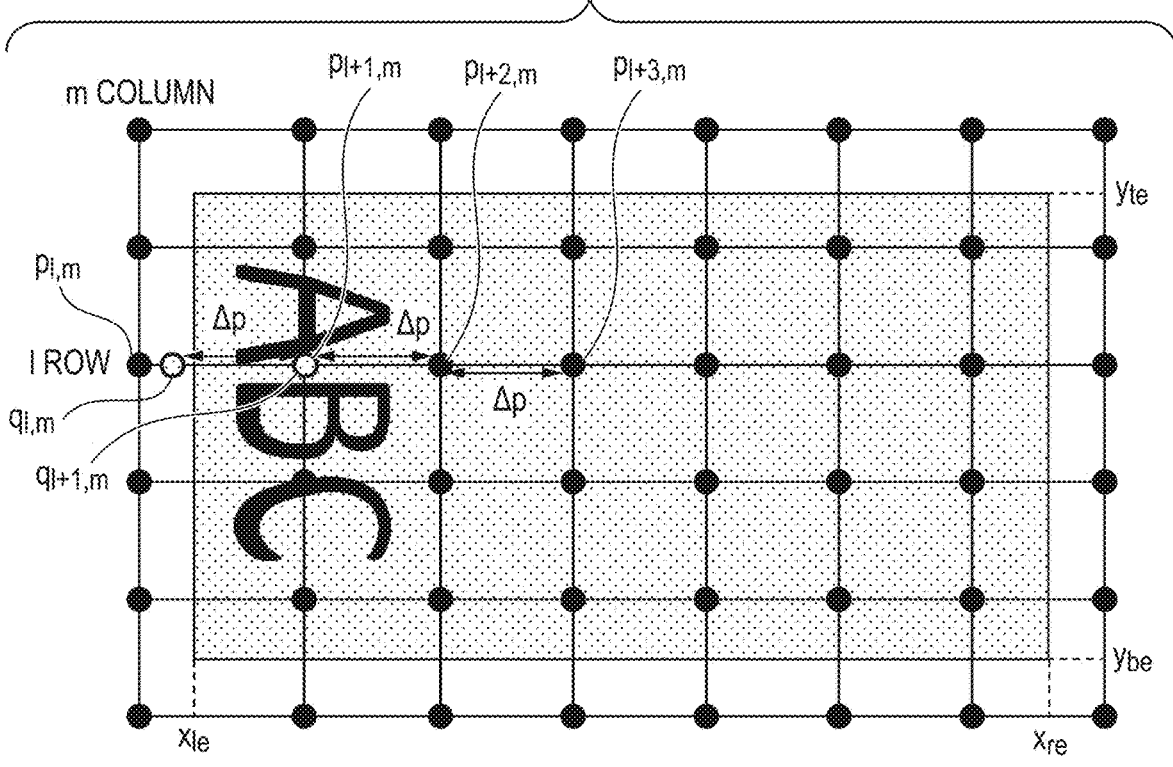
F I G. 10B
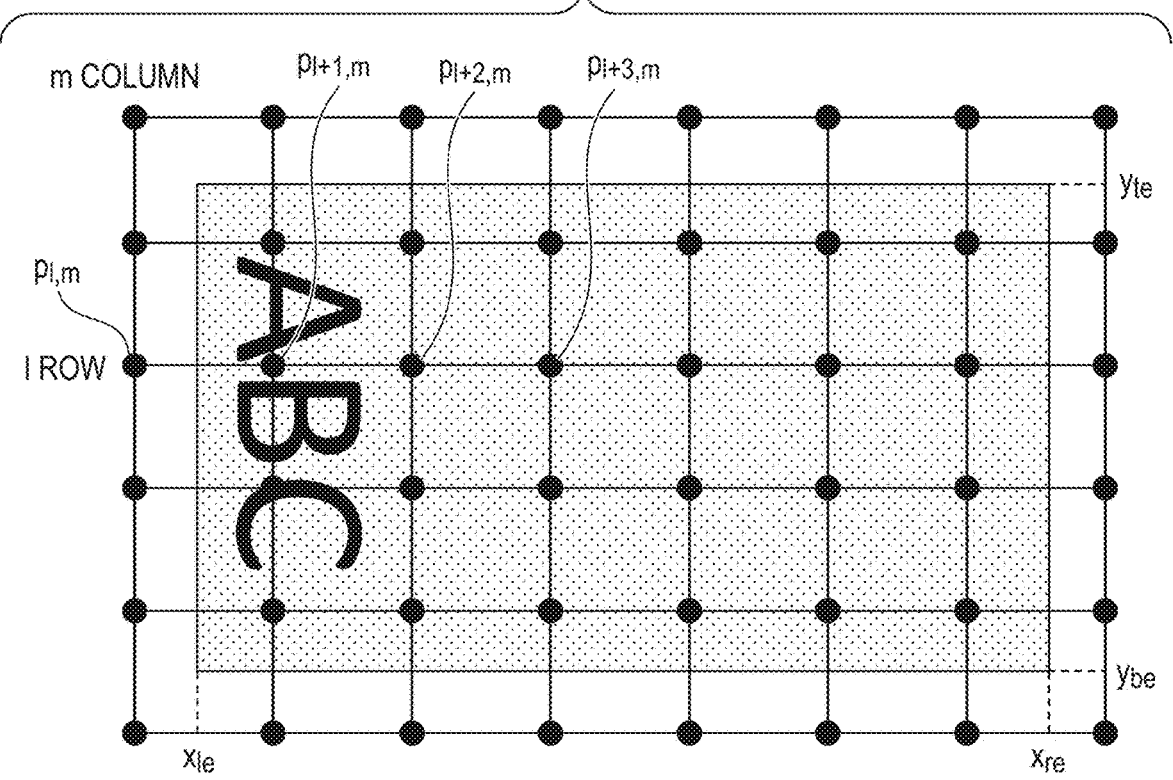

F I G. 12A
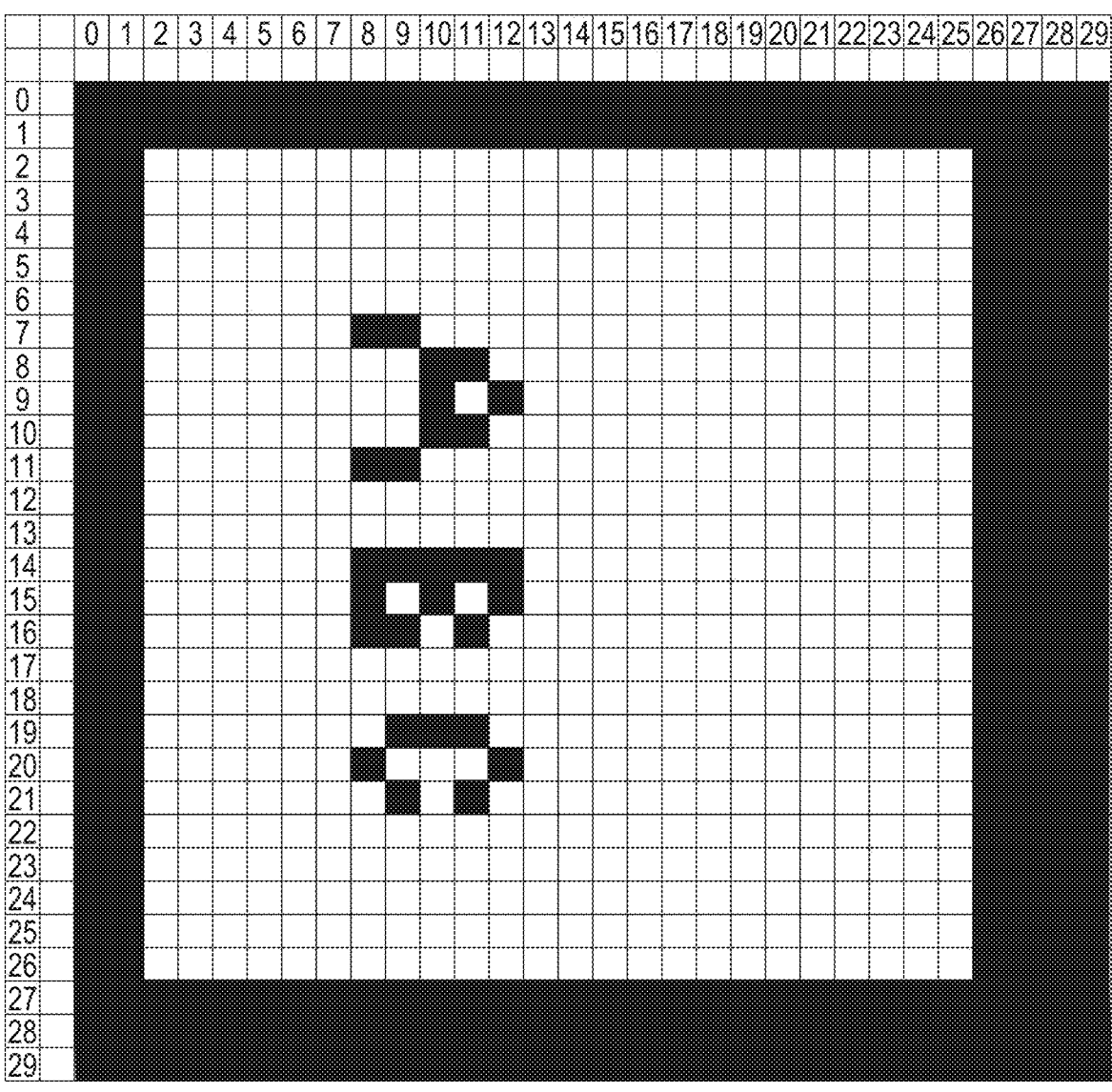

F I G. 12B
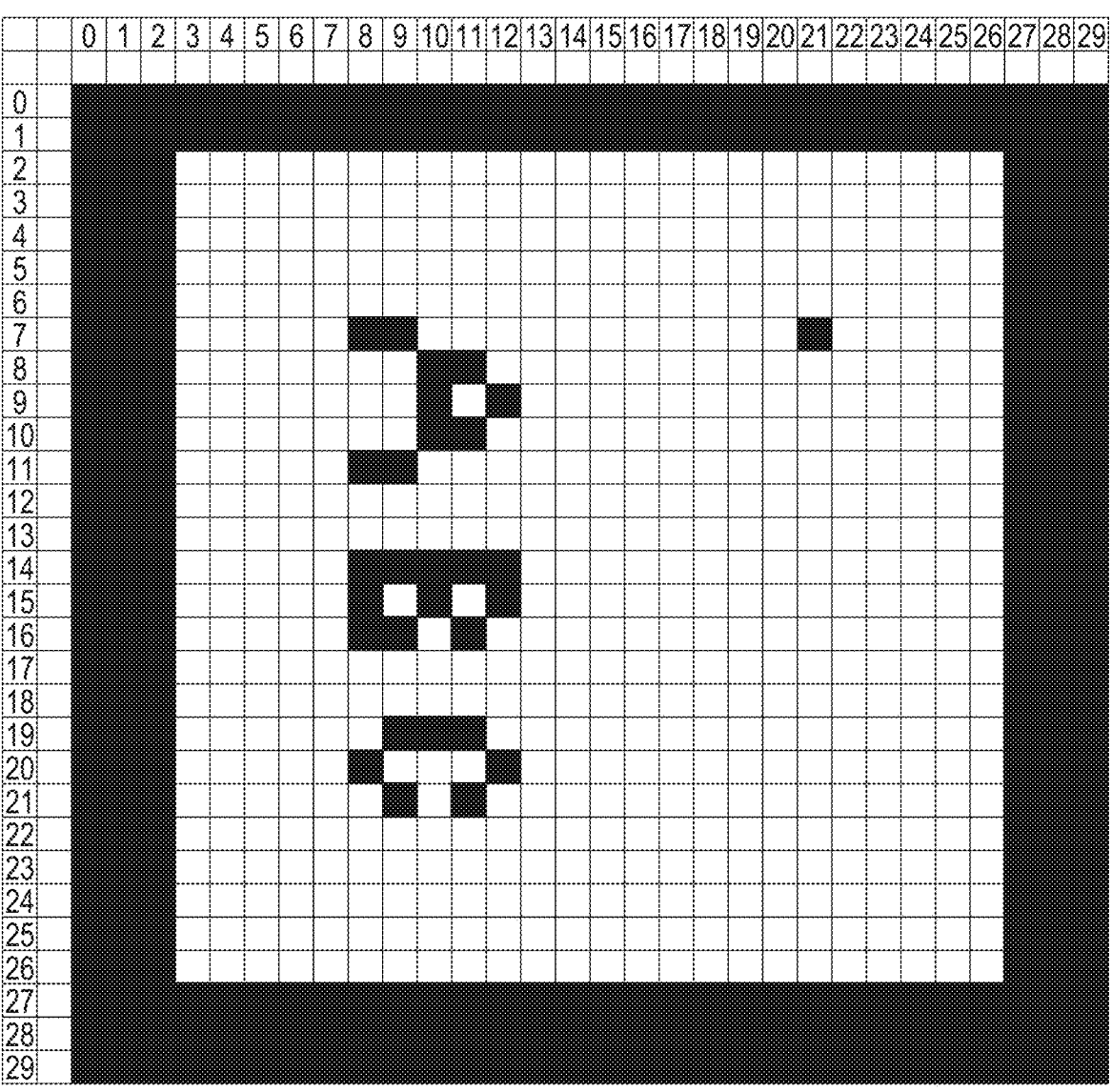

F I G. 12D
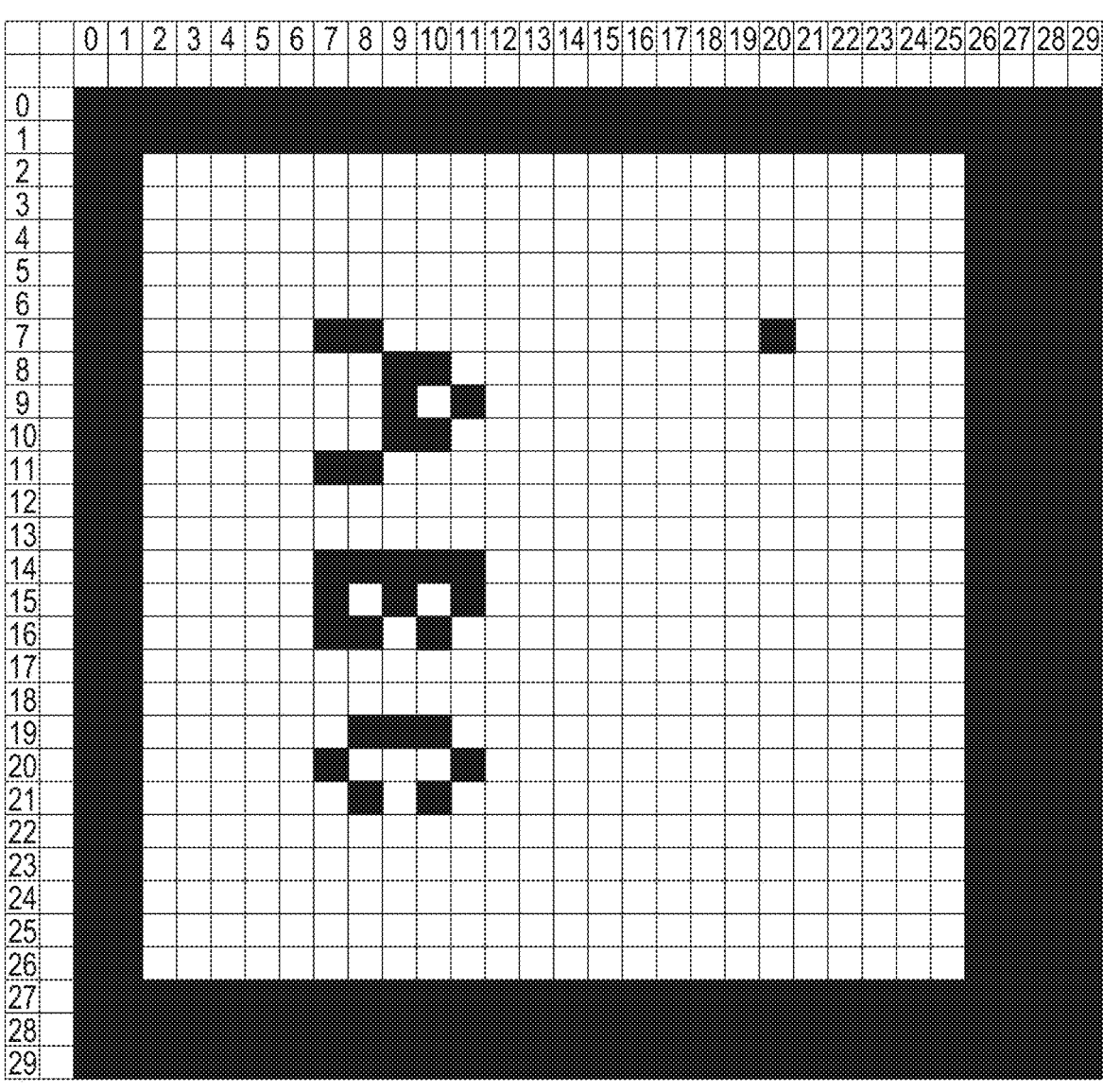

F I G. 12E
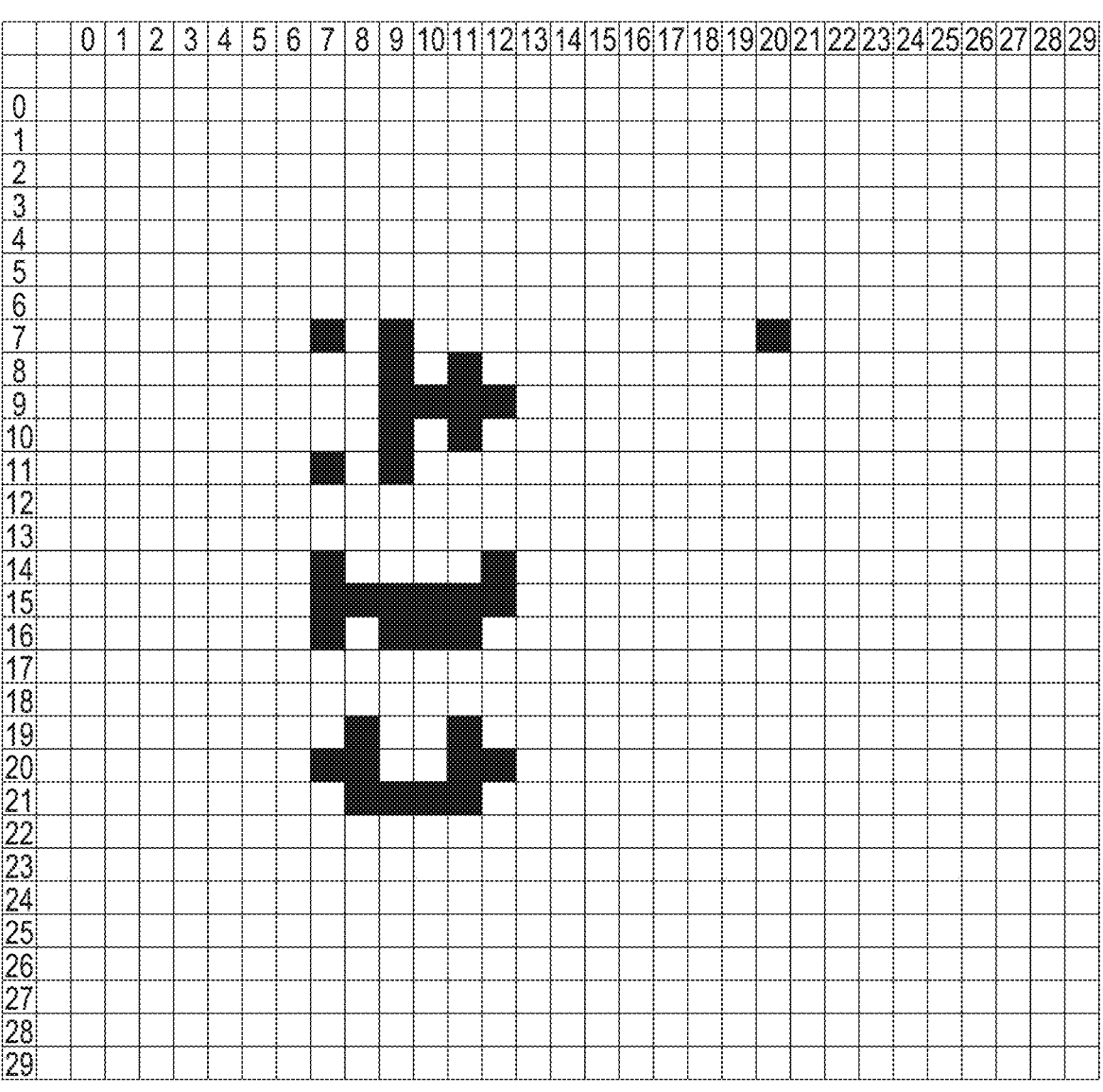

F I G. 12F
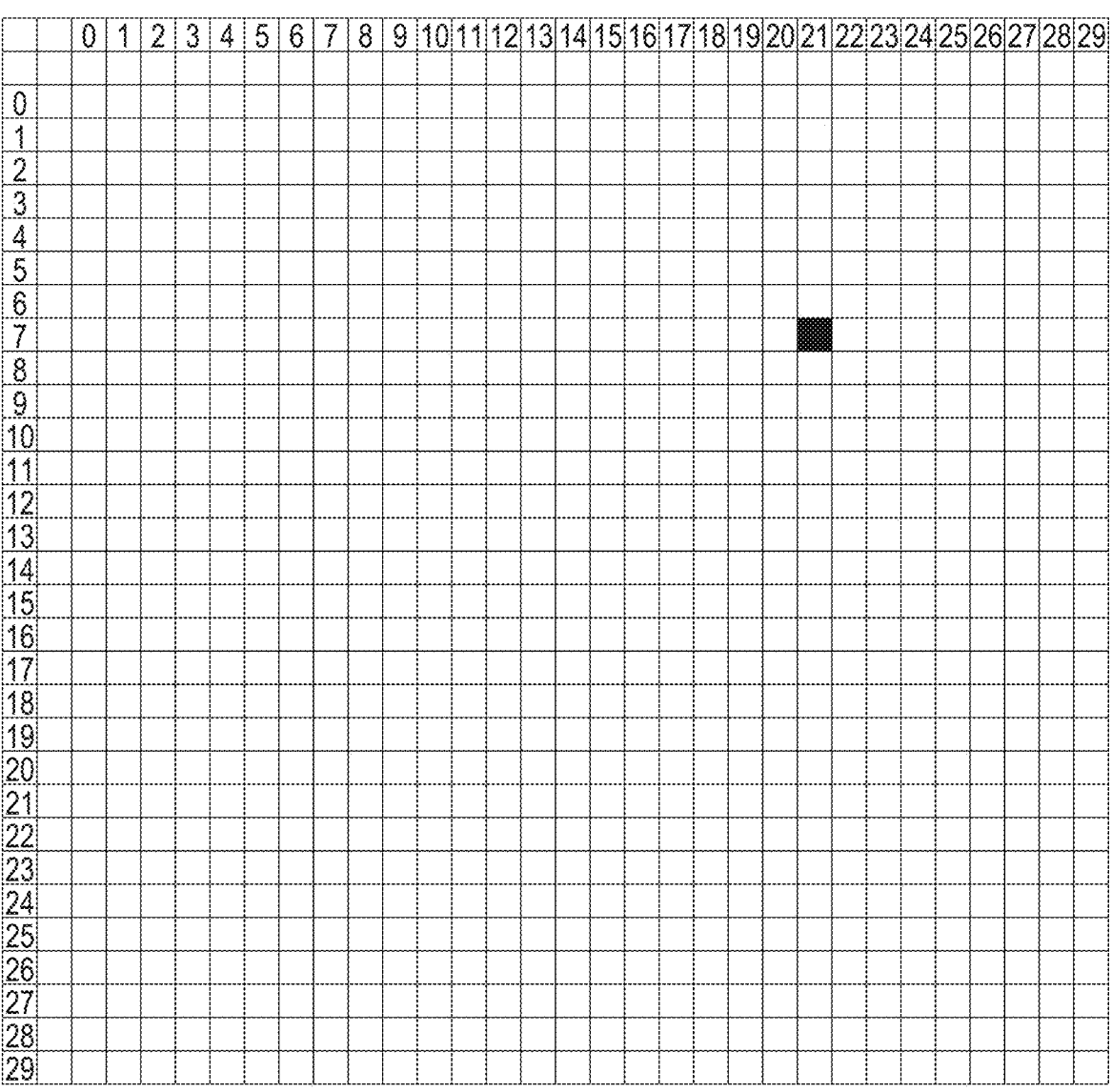

F I G. 13
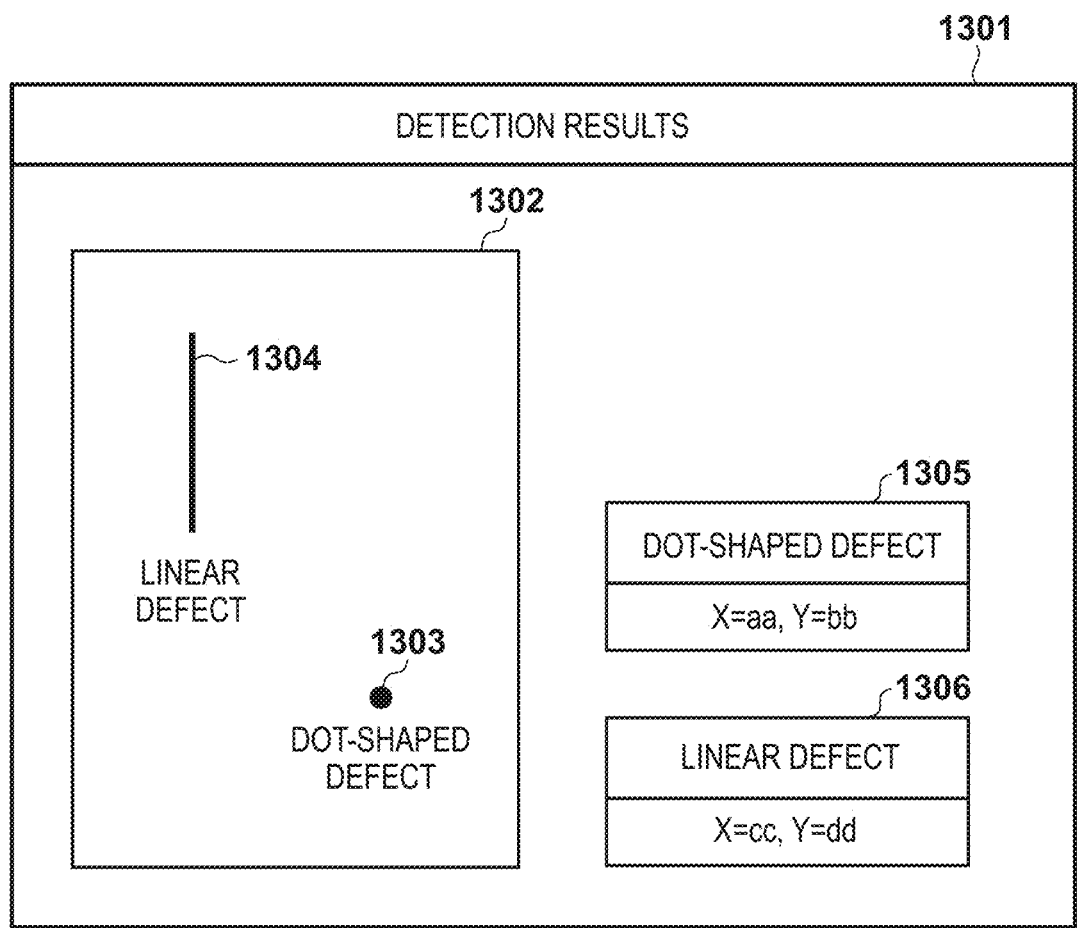

F I G. 14
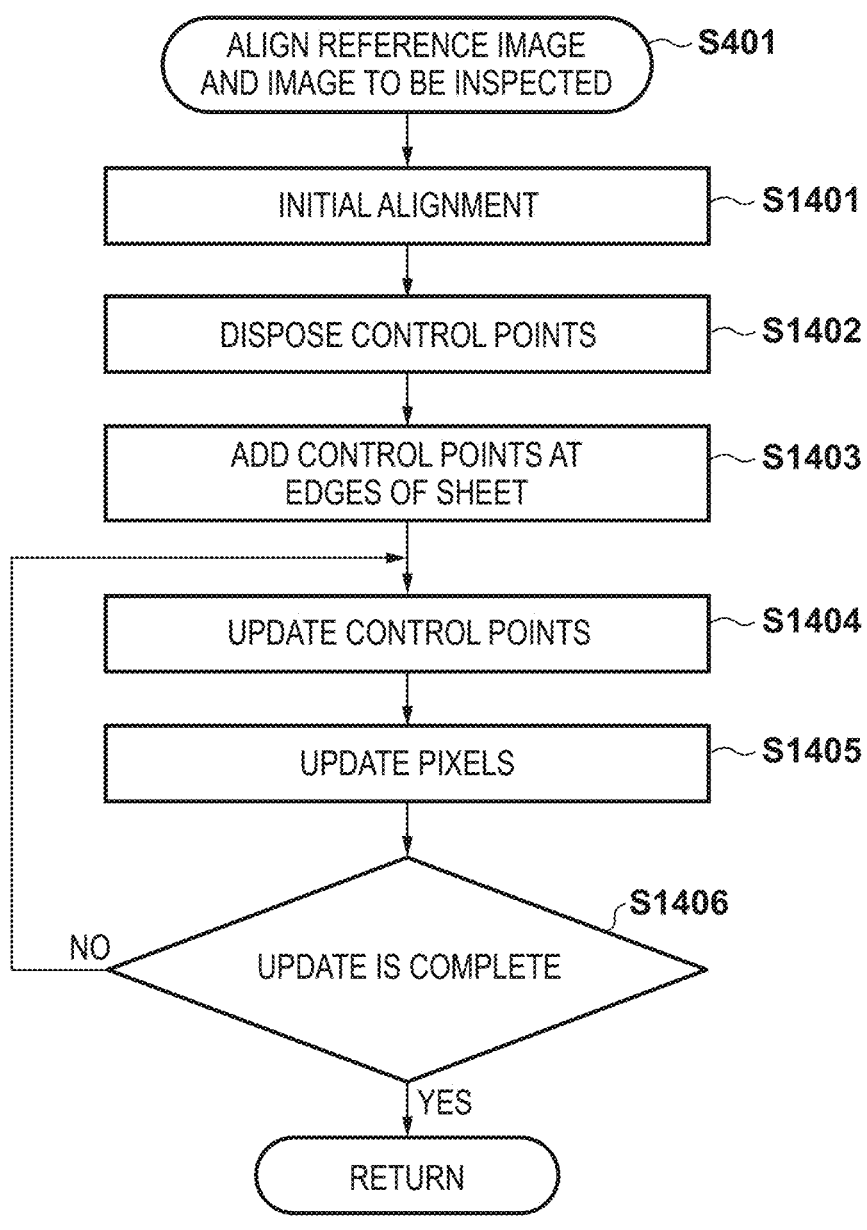

F I G. 15
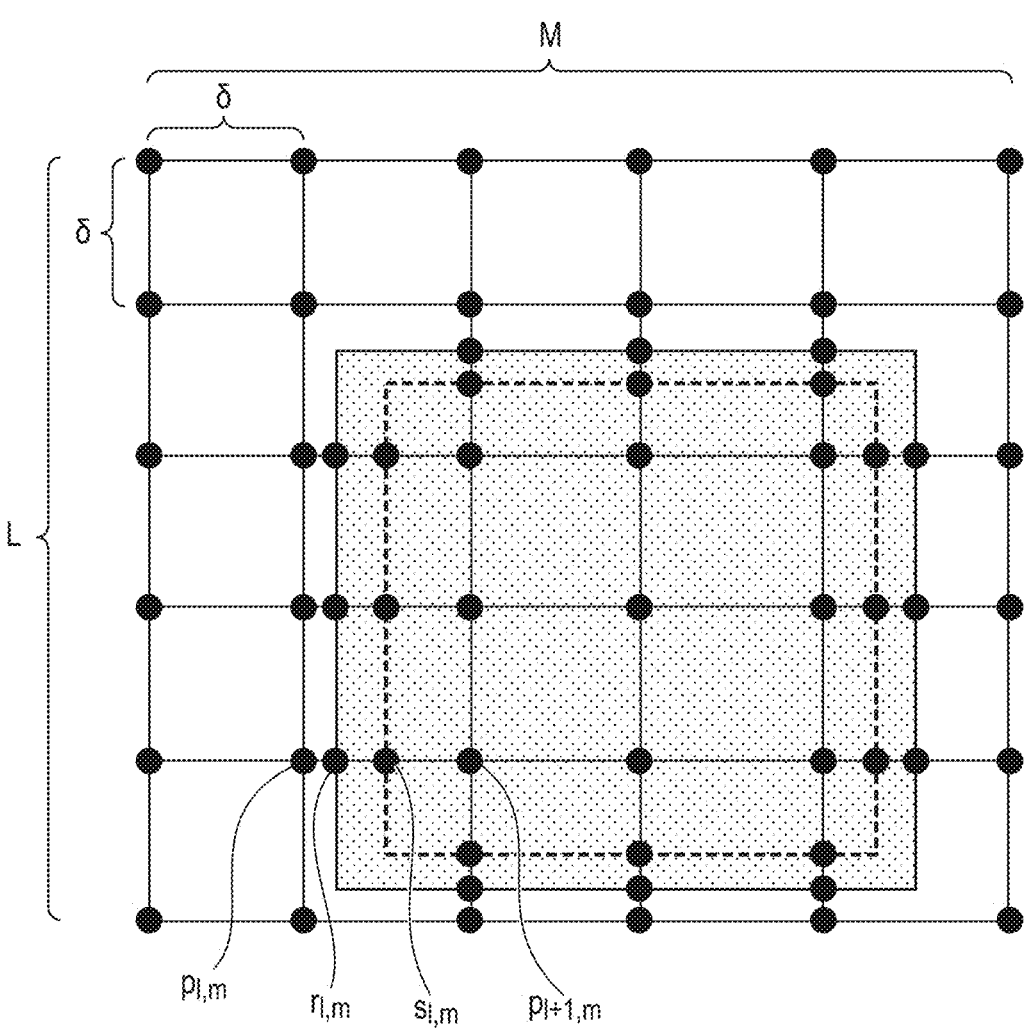

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Inspection systems that automatically perform inspections are known. An inspection system that automatically performs inspection uses a method of inspecting for defects in a printed image that includes reading an image of a printed matter using a scanner and comparing image data of the read image with a reference image. When inspecting an image by comparing images in this manner, the alignment of the images greatly affects the inspection accuracy. Thus, it is important to accurately align the images for such image inspection.

A typical alignment method includes extracting feature points of the images and performing alignment using a rigid registration such as projective transformation. For example, in Japanese Patent Laid-Open No. 2020-118497, feature points of a printed image at a leading edge and a trailing edge of a printed matter in a conveyance direction are extracted and alignment is performed using a rigid-body transformation. However, alignment using the rigid-body transformation cannot compensate for localized misalignment caused by conveying unevenness or paper stretching.

An example of a more accurate alignment method is the known method of non-rigid registration or Free-Form Deformations (FFD). By using such the non-rigid registration method, alignment of images including localized scaling and misalignment can be performed. Thus, compared to alignment using the rigid-body transformation, the alignment can be more accurate.

With Free-Form Deformations, control points for controlling the shape of an image are disposed in a grid-like pattern on the image, and the image is deformed by individually moving the control points. Then, to obtain the layout of the control points for performing deformation so that the image data to be inspected is aligned with the reference image, errors in the image are calculated and the positions of the control points are successively updated in a direction so that an amount of the error is reduced.

Generally, it is known that accuracy of alignment is reduced at or near the edges of a sheet. The cause of this is considered to be not in the print data but due to the print position relative to the sheet in the printing apparatus being misaligned. When the print position relative to the sheet is misaligned due to the effects of print position misalignment, the accuracy of the alignment particularly at or near the edges of the sheet may be reduced and a print defect may be mistakenly detected at or near the edges of the sheet.

SUMMARY OF THE INVENTION

Embodiments of the present disclosure eliminate the above-mentioned issues with conventional technology.

A feature of the present invention is to provide a technique that can reduce erroneous detection at or near an edge of a printing medium when print position misalignment occurs when inspecting an image using non-rigid-body alignment.

According to a first aspect of embodiments of the present disclosure, there is provided an image processing apparatus that inspects an image formed on a printing medium by a printing apparatus, comprising: one or more controllers including one or more processors and one or more memories, the one or more controllers being configured to: read an image for inspection formed on a printing medium and obtain a target image to be inspected; correct a position of a control point, from among control points disposed on the target image, at or near an edge of the printing medium, and perform alignment using the corrected control point so as to align the target image to a reference image using a non-rigid-body alignment; and inspect for a defect in the target image on a basis of the aligned target image and the reference image after the alignment; wherein, in the correcting, the position of the control point at or near the edge of the printing medium is corrected on a basis of an interval between adjacent control points at or near the edge of the printing medium.

According to a second aspect of the present disclosure, there is provided an image processing apparatus that inspects an image formed on a printing medium, comprising: one or more controllers including one or more processors and one or more memories, the one or more controllers being configured to: read an image for inspection formed on a printing medium and obtain a target image to be inspected; align the target image to a reference image; obtain a difference between the aligned target image and the reference image; determine whether a pixel of the target image is at or near an edge of the printing medium; and inspect for a defect in the aligned target image on a basis of the obtained difference and processing parameters, wherein, in the alignment of the target image, the one or more controllers changes methods for the alignment depending on a determination result.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 4 is a flowchart for describing the inspection processing of step S305 in FIG. 3.

FIGS. 5A and 5B depict views respectively illustrating examples of filters for emphasizing a printing defect.

FIG. 6 is a flowchart for describing processing of the alignment processing executed in step S401 in FIG. 4 by an alignment processing module according to the first example.

FIGS. 7A to 7C are diagrams for describing an example of alignment processing according to the first example.

FIGS. 9A and 9B depict views respectively illustrating an example of a reference image and an image to be inspected.

FIGS. 10A and 10B are diagrams for describing specific examples of correction of control points in step S606 in FIG. 6.

FIGS. 12A to 12F are schematic diagrams for describing how the processing obtains the difference image according to the first example.

FIG. 13 depicts a view illustrating an example of a UI screen where the image processing apparatus displays the detection results on a UI panel according to the first example.

FIG. 14 is a flowchart for describing processing of the alignment processing executed in step S401 in FIG. 4 by the alignment processing module according to a second example.

FIG. 15 is a diagram illustrating an example of an arrangement of control points according to the second example.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

First Example

Figure 1:
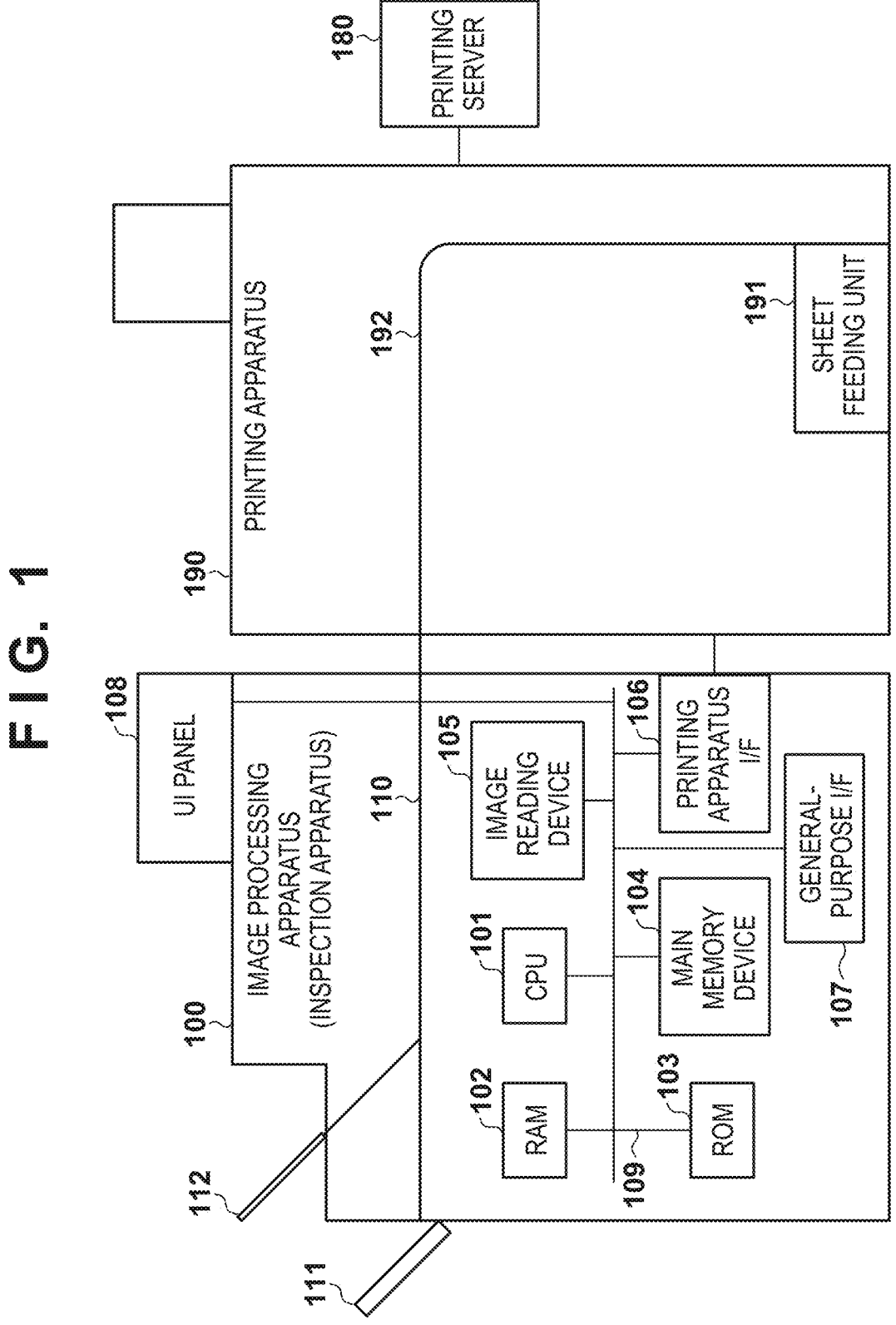
FIG. 1 is a diagram for describing the configuration of a printing system for outputting printed matters and performing inspections including an image processing apparatus (inspection apparatus) according to a first example of the present invention.

FIG. 1 is a diagram for describing the configuration of a printing system for outputting printed matters and performing inspections. The printing system includes an image processing apparatus (inspection apparatus) 100 according to the first example of the present invention.

The printing system according to the first example at least includes the image processing apparatus 100 that executes inspection processing, a printing server 180, and a printing apparatus 190. The printing server 180 has the functions of generating a print job for executing printing and supplying the print job to the printing apparatus 190. The printing server 180 may be communicatively connected to a plurality of non-illustrated external apparatuses via a network and may receive requests to generate print jobs and print data from the external apparatuses. Also, the printing server 180 can execute raster image processing (RIP) for obtaining a reference image. Specifically, in RIP processing for obtaining a reference image, image data is generated with the resolution converted from 600 dpi to 300 dpi, for example. Also, in RIP processing for generating print data, the resolution may not be lowered to generate image data of 600 dpi.

The printing apparatus 190 forms (prints) an image on a printing medium (sheet) on the basis of the print job supplied from the printing server 180. The printing apparatus 190 may use an offset printing method apparatus, an electro-photographic apparatus, an inkjet method apparatus, or the like. In the description of the first example, an electro-photographic printing apparatus is used as an example, but no such limitation on the present invention is intended. The printing apparatus 190 includes a sheet feeding unit 191, and a user sets sheets in the sheet feeding unit 191 in advance. When a print job is supplied to the printing apparatus 190, a sheet set in the sheet feeding unit 191 is conveyed along a conveyance path 192, an image is formed on the front surface or both surfaces, and then the sheet is conveyed to the image processing apparatus 100.

The image processing apparatus 100 executes inspection processing to check for image defects on the sheet (also referred to as printing medium and the like) with an image formed by the printing apparatus 190 that has been conveyed along the conveyance path 192, that is the printed matter. In other words, the image processing apparatus 100 functions as an inspection apparatus. Note that here, the overall processing for inspecting for image defects may be referred to as inspection processing, and the processing included in the inspection processing for detecting the various types of image defects may be referred to as defect inspection processing (or simply as detection processing).

The image processing apparatus 100 is internally provided with a CPU 101, a RAM 102, a ROM 103, a main memory device 104, and an image reading device 105. Also, the image processing apparatus 100 includes an interface (I/F) 106 with the printing apparatus 190, a general-purpose interface (I/F) 107, a user interface (UI) panel (operation panel) 108, a main bus 109. Furthermore, the image processing apparatus 100 includes a conveyance path 110 for printed matters connected to the conveyance path 192 of the printing apparatus 190, an output tray 111 where printed matters that pass inspection are discharged, and an output tray 112 where printed matters that fail inspection due to a defect being found are discharged. Note that the printed matters may be sorted into more detailed categories rather than just the two categories of image inspection pass and fail.

The CPU 101 is a processor that controls the entire image processing apparatus 100. The RAM 102 functions as the main memory, working area, and the like of the CPU 101. The ROM 103 stores a group of programs executed by the CPU 101, various types of data, and the like. The main memory device 104 stores applications executed by the CPU 101, data used in the image processing, and the like. The image reading device (scanner) 105 can read one surface or both surfaces of the printed matter conveyed from the printing apparatus 190 on the conveyance path 110 and obtain image data. Specifically, the image reading device 105 uses one or more reading sensors provided at or near the conveyance path 110 to read one surface or both surfaces of the conveyed printed matter. The reading sensor may be provided on the side of one surface or may be provided on both sides, the front surface and the back surface of the conveyed printed matter, so that both surfaces of the printed matter are simultaneously read. In a case that the reading sensor is provided on the side of one surface, the other surface by be read by the reading sensor by using a non-illustrated double-sided conveyance path in the conveyance path 110 to reverse the front and the back of the conveyed printed matter after the first surface is read.

The printing apparatus I/F 106 is connected to the printing apparatus 190 and can synchronize the timing of the processing of the printed matter and share operation situations with the printing apparatus 190. The general-purpose I/F 107 is a USB, IEEE 1394, or similar serial bus interface that allows a user to remove data such as logs and insert data into the image processing apparatus 100. The UI panel 108 includes a display (display unit) with a touch panel function, for example, and functions as the user interface of the image processing apparatus 100 to communicate to the user via a display of the current situation and settings. Instructions from the user can be received by the user operating a button displayed on the touch panel display. The main bus 109 connects the above described components of the image processing apparatus 100. The internal components of the image processing apparatus 100 and printing system can be made to operate via instructions from the CPU 101 sent via the main bus 109. For example, in sync with operation of the conveyance path 110, whether to convey the printed matter to the output tray 111 for printed matters that passed or the output tray 112 for printed matters that failed can be switched depending on the inspection result. Also, a GPU may be provided in addition to a CPU.

The image processing apparatus 100 according to the first example conveys a printed matter conveyed from the printing apparatus 190 along the conveyance path 110 and executes the inspection processing described below on the basis of the image data of the printed matter obtained via reading by the image reading device 105. When the result of the inspection processing is determined to an inspection pass for the printed matter, the printed matter is conveyed to the output tray 111 for printed matters that passed. Otherwise, the printed matter is conveyed to the output tray 112 for printed matters that failed. In this manner, only the printed matters with confirmed print quality can be collected at the output tray 111 as printed matters for delivery.

Figure 2:
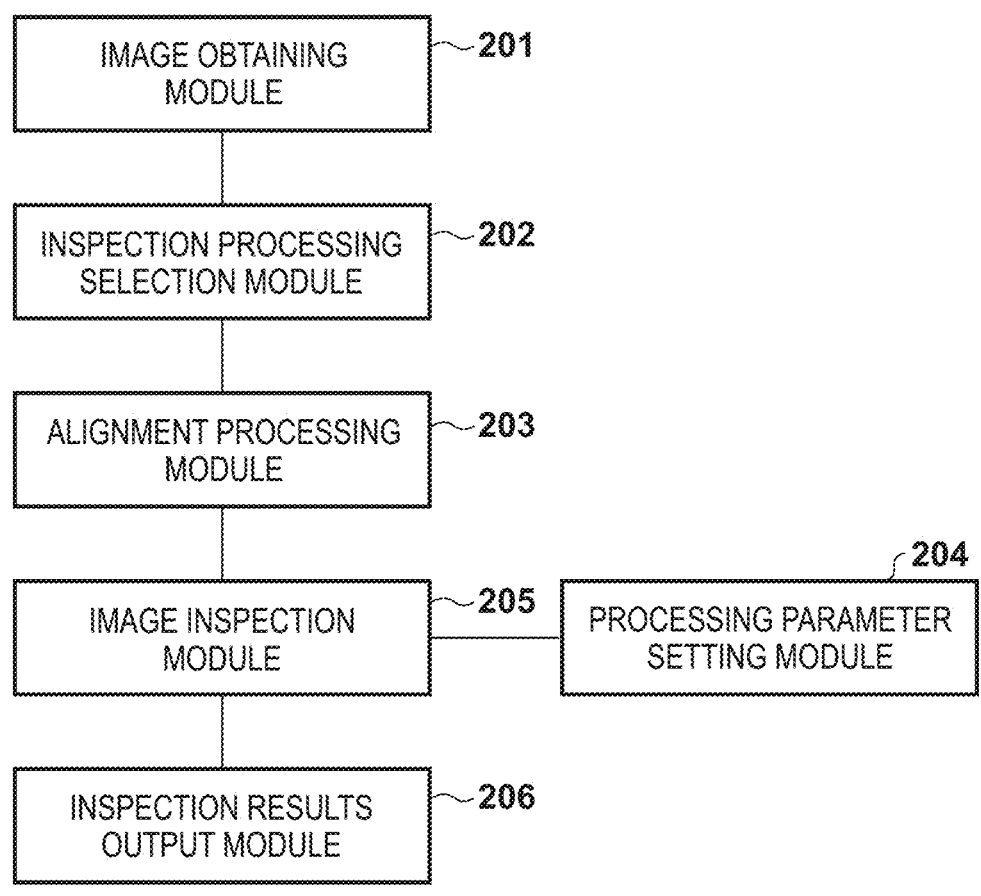
FIG. 2 is a functional block diagram for describing the functions of the image processing apparatus according to the first example.

FIG. 2 is a functional block diagram for describing the functions of the image processing apparatus 100 according to the first example. Note that the functions illustrated in the block diagram are implemented by the CPU 101 deploying programs stored in the ROM 103 into the RAM 102 and executing the deployed programs.

Figure 3:
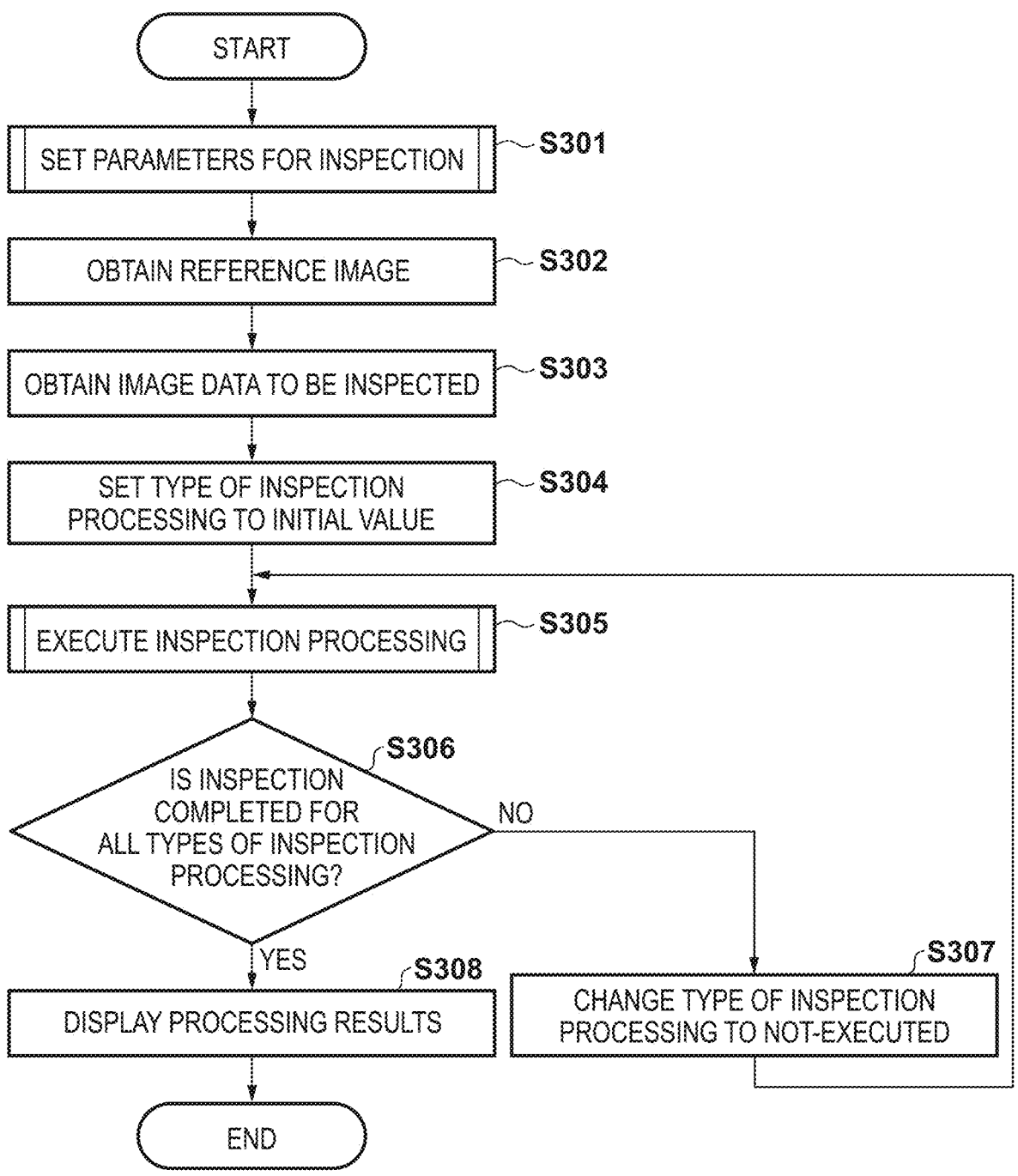
FIG. 3 is a flowchart for describing processing of the inspection processing executed by the image processing apparatus according to the first example.

FIG. 3 is a flowchart for describing processing of the inspection processing executed by the image processing apparatus 100 according to the first example. The processing described below is implemented by the CPU 101 deploying programs stored in the ROM 103 into the RAM 102 and executing the programs. Also, hereinafter, the step number of the processing is indicated by a number following the letter S. Hereinafter, the processing of the inspection processing, which is the overall processing to inspect for image defects, will be described with reference to FIGS. 2 and 3. Note that in the example described using FIG. 3, the CPU 101 functions as the functional modules illustrated in FIG. 2.

First, in step S301, an inspection processing selection module 202 and a processing parameter setting module 204, on the basis of a user input, select a plurality of defect inspection processing to execute and set the parameters for the selected plurality of defect inspection processing. Note that naturally, only one defect inspection processing can be selected.

The inspection processing selection module 202 receives a user selection of defect inspection processing among the plurality of defect inspection processing via a selection screen (not illustrated) displayed on the UI panel 108. On the selection screen, for example, one or more types of defects can be selected and the defect inspection processing for detecting the selected defect may be selected. The types of defects may include dot-shaped defects and linear (streak) defects described in the first example as well as discretionary types of defects such as image unevenness and a defect of surface shape. If the defect type is not selected by the user, the predetermined default defect inspection processing may be selected.

Then, the processing parameter setting module 204 registers the parameters for executing the defect inspection processing selected by the inspection processing selection module 202. The parameters include a filter appropriate for the defect type, a threshold for determining whether there is a defect or not, and the like. Of these parameters, the threshold is set on the basis of a difference value sent from the printing apparatus 190. The detailed processing for setting parameters will be described below.

Subsequently, in step S302, an image obtaining module 201 obtains a reference image (reference image data) from the RAM 102 or the main memory device 104. In this example, the reference image is stored in advance in the RAM 102 or the main memory device 104.

There are two methods for generating the reference image. The first method includes executing a print job, generating a printed matter, and scanning the printed matter with the image reading device 105 to generate the reference image. Here, a print job for registering the reference image is supplied from the printing server 180 to the printing apparatus 190 to cause the printing apparatus 190 to execute printing of the reference image. When printing is executed, the image processing apparatus 100 detects the sheet with the printed reference image being conveyed and scans the sheet using the image reading device 105. Then, the scanned image data is stored in the RAM 102 or the main memory device 104 of the image processing apparatus 100 as the reference image.

The other method includes not using a scanned image but analyzing a print job and using image data after RIP processing to generate image data as the reference image. In the first example described herein, the image data after RIP processing is used as the reference image.

Subsequently, in step S303, the image obtaining module 201 obtains image data to be inspected (read image) by using the image reading device 105 to read the printed matter to be inspected conveyed from the printing apparatus 190. Note that a configuration may be used that reads the image data to be inspected in advance using the image reading device 105 and obtains the scanned image data stored in the main memory device 104.

Subsequently, the processing proceeds to step S304, from among the plurality of defect inspection processing stored in the RAM 102, the inspection processing selection module 202 selects defect inspection processing to be executed and sets the selected defect inspection processing as an initial value. The initial value indicates that the defect inspection processing is to be executed for the first time, and when there is no priority order in particular for executing the defect inspection processing, the selected order or a similar discretionary order may be used.

Subsequently, the processing proceeds to step S305, an alignment processing module 203 and an image inspection module 205 perform alignment of the image to be inspected to the reference image and execute the defect inspection processing. This is described below in detail with reference to FIG. 4.

Then, the processing proceeds to step S306, the image inspection module 205 determines whether or not all of the selected inspection types of defect inspection processing have been completed. If all of the defect inspection processing has been completed, the processing proceeds to step S308, and if an incomplete defect inspection processing remains, the processing proceeds to step S307. In step S307, the inspection processing selection module 202 changes the type of the inspection processing to be executed next to not-executed, and the processing returns to step S305. In this manner, in step S306, the processing of steps S305 to S307 are repeated until all of the selected defect inspection processing are completed. Accordingly, in step S306, when all of the selected inspection types of defect inspection processing are complete, the processing proceeds to step S308, an inspection results output module 206 generates inspection results. The inspection results are displayed on the UI panel 108, then the processing ends. The display processing will be described in detail below with reference to FIG. 13.

Next, the processing process of the defect inspection processing executed in step S305 by the alignment processing module 203 and the image inspection module 205 according to the first example will be described with reference to FIG. 4. The processing described below is implemented by the CPU 101 deploying programs stored in the ROM 103 into the RAM 102 and executing the programs. Also, hereinafter, the step number of the processing is indicated by a number following the letter S.

FIG. 4 is a flowchart for describing the inspection processing of step S305 in FIG. 3. Note that in the example described using FIG. 4 also, the CPU 101 functions as the functional modules illustrated in FIG. 2.

First, in step S401, the alignment processing module 203 performs alignment of the image to be inspected (read image) to the reference image. The details are described below with reference to FIGS. 6 and 7. Subsequently, the processing proceeds to step S402, the image inspection module 205 obtains a difference image of the reference image and the image to be inspected. Herein, a difference image is generated by comparing the reference image and the image to be inspected pixel by pixel and obtaining difference values of the pixel values (for example, density value for R, G, and B) for each pixel. Subsequently, the processing proceeds to step S403, the image inspection module 205 executes filter processing on the difference image obtained in step S402 to emphasize the specific shape.

FIGS. 5A and 5B depict views respectively illustrating examples of filters for emphasizing a printing defect.

As examples, FIG. 5A illustrates a filter for emphasizing a dot-shaped defect, and FIG. 5B illustrates a filter for emphasizing a linear defect. These filters may be changed depending on the type of the defect inspection processing selected in step S304. For example, when dot-shaped defect detection is selected as the type of the defect inspection processing, the filter illustrated in FIG. 5A is used to execute the processing. When linear defect detection is selected as the type of the defect inspection processing, the filter illustrated in FIG. 5B is used to execute the processing.

Subsequently, the processing proceeds to step S404, the image inspection module 205 executes binarization processing on the difference image after emphasizing processing so that the difference values equal to or greater than a threshold are set to 1 and the difference values equal to or less than the threshold are set to 0. Subsequently, the processing proceeds to step S405, the image inspection module 205 determines whether or not a pixel of the image after binarization processing exists that has been set to 1 by having a value greater than the threshold. When such a pixel exists, the processing proceeds to step S406, and when no such pixel exists, it is determined that there are no defect sections and the processing ends. In step S406, having a defect section existing being determined, the image inspection module 205 associates together and stores the type of the defect inspection processing used to detect the defect section and the coordinates of the defect portion. The processing then ends. Note that the flowchart in FIG. 4 is a subroutine of step S305 and indicates the flow of one defect inspection processing. Accordingly, each time the subroutine of step S305 is invoked, the selected type of the defect inspection processing is executed and the filter processing (step S403) corresponding to the selected type is executed.

Note that in the first example described herein, processing to detect dot-shaped defects and processing to detect linear defects are used as examples of defect inspection processing. However, the present invention is not limited thereto. In other words, the present invention may be applied to any processing that can detect a defect desired by a user, and is not limited in terms of the types of the processing to detect defects.

Next, the processing parameters (detection parameters) set in step S301 in FIG. 3 by the processing parameter setting module 204 will be described. In the first example described above, filter processing (step S403) and binarization processing (step S404) are executed on the obtained difference image. At this time, for example, reducing the shape of the filter illustrated in FIG. 5A results in dot-shaped defects that are smaller in size being emphasized and more easily detected. Also, by decreasing the threshold for the binarization processing, smaller differences become greater than the threshold in the binarization processing and are set to 1, making them detected as defects. In other words, defects with a smaller contrast can be detected. The parameters relating to the size of the filter, the threshold used when detecting, and the like are set in step S301 as the processing parameters.

Next, alignment processing will be described. In the first example, two types of alignment are performed. The first type is alignment using information in the image. This processing is described below in detail. The second type is alignment using vertices of sheet. In alignment using the vertices of sheet, the image is deformed so that the vertices of the sheet of the image to be inspected (read image) match the vertices of the reference image. For the deformation of the image, geometric transformation, affine transformation, or a similar known method may be used.

Next, alignment using information in the image according to the first example will be described.

The processing process of the alignment processing executed in step S401 in FIG. 4 by the alignment processing module 203 according to the first example will be described with reference to FIGS. 6 and 7.

FIG. 6 is a flowchart for describing processing of the alignment processing executed in step S401 in FIG. 4 by the alignment processing module 203 according to the first example. FIGS. 7A to 7C are diagrams for describing an example of the alignment processing according to the first example.

In the example of the alignment processing according to the first example described herein, a target image I to be inspected illustrated in FIG. 7A is aligned with a reference image T to obtain a post-alignment target image I'. Note that I(x,y), T(x,y), I'(x,y) represent the pixel values at the coordinates (x,y). Note that the processing described using FIG. 6 is implemented by the CPU 101 deploying programs stored in the ROM 103 into the RAM 102 and executing the programs. Also, hereinafter, the step number of the processing is indicated by a number following the letter S.

In step S601, the alignment processing module 203 performs initial alignment. Here, a typical alignment may be used. One conceivable method includes extracting the feature points and performing projective transformation to set the sum of the Euclidean distances of the feature points to a minimum.

Subsequently, the processing proceeds to step S602, the alignment processing module 203 disposes a plurality of control points. As illustrated in FIG. 7B, L x M number of control points are disposed in a grid-like pattern on the input target image I. At this time, a distance δ between control points is determined from L, M, and the image size of the reference image. The coordinates of the control point at 1 row and m column correspond to $p_{l,m}$ (l=1, . . . , L, m=1, . . . , M).

Subsequently, the processing proceeds to step S603, the alignment processing module 203 updates the positions of the control points. The formula used in the update at this time is represented by the following Formula (1). Herein, μ represents a weighting coefficient and may be a value such as 0.1 or may change according to the speed of the update of the control points, for example. $\nabla c$ is a differential value of the sum of squares of the difference in pixel values between the reference image T and the post-alignment target image I' at a set $D_{l,m}$ at a location of pixels at or near the control point $p_{l,m}$ indicated in Formula (2) and illustrated in FIG. 7B.

$$p_{l,m} = p_{l,m} + \mu \frac{\nabla c}{\|\nabla c\|} \qquad \text{Formula (1)}$$

$$\nabla c = \frac{\partial}{\partial p_{l,m}} \sum\nolimits_{D_{l,m}} |I'(x, y) - T(x, y)|^2 \qquad \text{Formula (2)}$$

Subsequently, the processing proceeds to step S604, the alignment processing module 203 performs an update of the pixels. This processing is described with reference to FIG. 7C. The update formula used at this time is represented by Formula (3).

$$I'(x,y)=I(w(x,y)) \qquad \text{Formula (3)}$$

Herein, w(x,y) represents Formula (4), and Formula (4) is a formula for calculating the coordinates of the pixels of the post-alignment-processed target image I' for the coordinates (x,y) in the target image I to be inspected.

$$w(x, y) = \sum\nolimits_{i=0}^{3} \sum\nolimits_{j=0}^{3} B_i(u')B_j(v')p_{u+i,v+j} \qquad \text{Formula (4)}$$

Bases $B_0(t)$, $B_1(t)$, $B_2(t)$, and $B_3(t)$ in Formula (4) are represented by Formula (5), Formula (6), Formula (7), and Formula (8), respectively.

$$B_0(t)=(1-t)^3/6 \qquad \text{Formula (5)}$$

$$B_1(t)=(3t^3-6t^2+4)/6 \qquad \text{Formula (6)}$$

$$B_2(t)=(-3t^3+3t^2+3t+1)/6 \qquad \text{Formula (7)}$$

$$B_3(t)=t^3/6 \qquad \text{Formula (8)}$$

As illustrated in FIG. 7C, u=⌊x/δ⌋-1, v=⌊y/δ⌋-1, u'=x/δ-⌊x/δ⌋, v'=y/δ-⌊y/δ⌋. Herein, ⌈x/δ⌉ and ⌈y/δ⌉ represent floor brackets, or in other words a number rounded up to an integer removing decimals.

Note that in the first example, the grid points used to calculate the pixels in the post-alignment-processed target image I' are a number 16 points corresponding to p(u,v), p(u+1,v), . . . p(u+3,v+3), but no such limitation is intended. For example, four grid points close in the (x,y) Euclidean distance may be used.

Subsequently, in step S605, the alignment processing module 203 determines whether or not the update is complete. Whether or not the update is complete may be determined on the basis of a distance d between the post-alignment-processed target image I' and the reference image T and a threshold, after the distance d is calculated. Here $$d = \frac{1}{XY}\sum\nolimits_{x=1}^{X} \sum\nolimits_{y=1}^{Y} |I'(x, y) - T(x, y)| \qquad \text{Formula (9)}$$

When the distance d is equal to or less than the threshold, the update processing ends.

Lastly, in step S606, the alignment processing module 203 performs correction of the control points at or near the edges of the sheet. This processing will be described below in detail with reference to FIGS. 8 to 10.

Next, the processing process of the correction of the control points at or near the edges of the sheet executed in step S606 by the alignment processing module 203 according to the first example will be described with reference to FIGS. 8, 9, and 10 as an advantage of the present embodiment.

Figure 8:
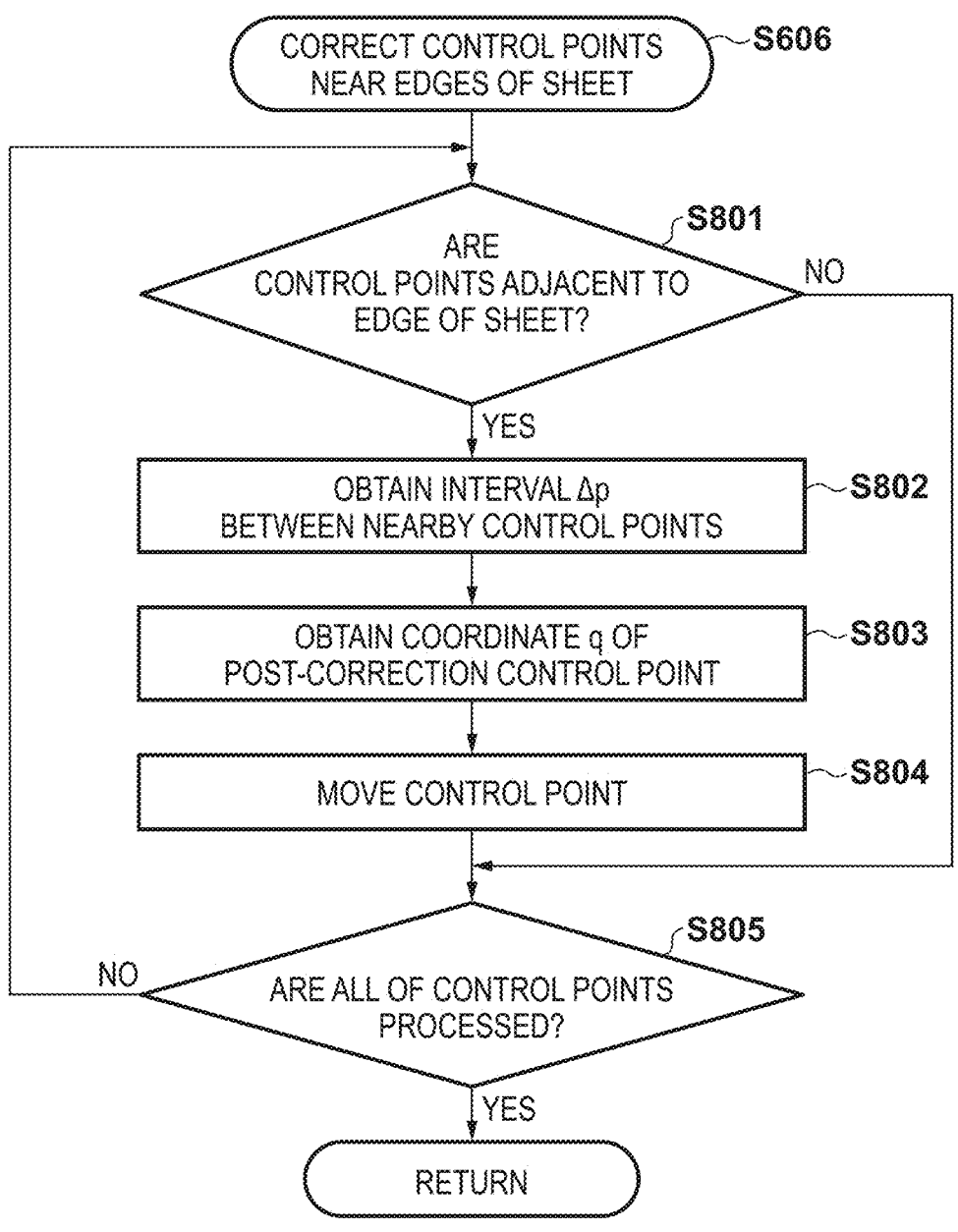
FIG. 8 is a flowchart for describing processing to correct control points at or near the edges of the sheet in step S606 in FIG. 6.

FIG. 8 is a flowchart for describing the processing to correct the control points at or near the edges of the sheet in step S606 in FIG. 6.

FIGS. 9A and 9B are schematic diagrams illustrating an example of the reference image and the target image to be inspected.

FIG. 9A is a schematic diagram illustrating an example of the reference image used as a reference in the alignment by the alignment processing module 203. FIG. 9B is a schematic diagram illustrating an example of the target image to be inspected which is the target of the alignment by the alignment processing module 203. FIG. 9B illustrates a case in which the print position of the target image to be inspected is offset to the left due to misalignment of the print position. The print position of the character string 'ABC' in FIG. 9B can be seen to be closer to the edge the sheet compared to the character string 'ABC' in FIG. 9A.

FIGS. 10A and 10B are diagrams for describing specific examples of correction of control points in step S606.

FIGS. 10A and 10B are schematic diagrams illustrating an example of the position of the control points before the alignment processing module 203 performs correction of the control points at or near an edge of the sheet on the target image to be inspected and after step S605. As can be seen in FIG. 10A, print position misalignment has caused the character string 'ABC' to be stretched in the lateral direction (long side direction of the sheet). This is because the character string 'ABC' of the target image to be inspected has been aligned with the position of the character string 'ABC' of the reference image, since the character string 'ABC' of the reference image is located more to the right than the character string 'ABC' of the target image to be inspected, using the edge of the sheet as a reference. Thus, if the difference between FIG. 9A and FIG. 10A is calculated, a large amount of error is found at or near the edge of the sheet. A control point $p_{l,m}$ in FIG. 10A indicates the control point at 1 row and m column.

FIG. 10B is a schematic diagram of the control points of the target image to be inspected after correction processing has been performed (step S606) on the control points at or near the edges of the sheet according to the first example.

In the correction of the control points at or near the edges of the sheet according to the first example described herein, correction is performed on the control points illustrated in FIG. 10A to obtain the control points illustrated in FIG. 10B.

The processing described below is implemented by the CPU 101 deploying programs stored in the ROM 103 on the RAM 102 and executing the programs. Also, hereinafter, the step number of the processing is indicated by a number following the letter S. The following processing is executed on all of the control points illustrated in FIG. 10A.

In step S801, the alignment processing module 203 determines whether or not a target control point $p_{l,m}$, $p_{l+1,m}$ or $p_{l,m+1}$ is a control point adjacent to the edge of the sheet. The coordinates of the control point $p_{l,m}$ are $(x_{l,m}, y_{l,m})$, the coordinates of the control point $p_{l+1,m}$ are $(x_{l+1,m}, y_{l+1,m})$, and the coordinates of the control point $p_{l,m+1}$ are $(x_{l,m+1}, y_{l,m+1})$.

Whether the target control point $p_{l,m}$ is adjacent to any one of the edges of the sheet is checked based on a left edge coordinate $x_{le}$, a right edge coordinate $x_{re}$, an upper edge coordinate $y_{te}$, and a lower edge coordinate $y_{be}$ of the sheet.

Whether or not the control point $p_{l,m}$ is adjacent to the left edge of the sheet may be a condition based on satisfying the following condition.

$$x_{l,n} < x_{le} \text{ and } x_{l+1,n} > x_{le} \qquad \text{Formula (10)}$$

Whether the control point $p_{l,m}$ is adjacent to the right edge of the sheet may be a condition based on satisfying the following condition.

$$x_{l,n} < x_{re} \text{ and } x_{l+1,n} > x_{re} \qquad \text{Formula (11)}$$

Whether the control point $p_{l,m}$ is adjacent to the upper edge of the sheet may be a condition based on satisfying the following condition.

$$y_{l,n} < y_{te} \text{ and } y_{l,n+1} > y_{te} \qquad \text{Formula (12)}$$

Whether the control point $p_{l,m}$ is adjacent to the lower edge of the sheet may be a condition based on satisfying the following condition.

$$y_{l,n} < y_{be} \text{ and } y_{l,n+1} > y_{be} \qquad \text{Formula (13)}$$

In a case that any one of these conditions is met, it is determined that the target control point $p_{l,m}$ is adjacent to any one of the edges of the sheet, and the processing proceeds to step S802, the correction of the control point is performed. When not met, it is determined that the control point $p_{l,m}$ is not adjacent to any one of the edges of the sheet, and the processing proceeds to step S805, the target control point is shifted to the next control point.

In step S802, the alignment processing module 203 calculates an interval $\Delta p$ between nearby control points. In the case of the left edge of the sheet, the following Formula (14) is used to obtain the interval $\Delta p$ for the control points.

$$\Delta p = p_{l+3,m} - p_{l+2,m} \qquad \text{Formula (14)}$$

In the case of the right edge of the sheet, the following Formula (15) is used to obtain the interval $\Delta p$ for the control points.

$$\Delta p = p_{l-1,m} - p_{l-2,m} \qquad \text{Formula (15)}$$

In the case of the upper edge of the sheet, the following Formula (16) is used to obtain the interval $\Delta p$ for the control points.

$$\Delta p = p_{l,m+3} - p_{l,m+2} \qquad \text{Formula (16)}$$

In the case of the lower edge of the sheet, the following Formula (17) is used to obtain the interval $\Delta p$ for the control points.

$$\Delta p = p_{l,m-1} - p_{l,m-2} \qquad \text{Formula (17)}$$

In step S803, the alignment processing module 203 obtains coordinates $q_{l,m}$ of the post-correction control point. In the case of the left edge, the coordinates $q_{l,m}$ are obtained using the following Formula (18) on the basis of control point $p_{l+2,m}$ and the interval $\Delta p$.

$$q_{l+1,m} = p_{l+2,m} - \Delta p$$

$$q_{l,m} = q_{l+1,m} - \Delta p \qquad \text{Formula (18)}$$

In the case of the right edge, the coordinates $q_{l,m}$ are obtained using the following Formula (19) on the basis of control point $p_{l-2,m}$ and $\Delta p$.

$$q_{l-1,m} = p_{l-2,m} + \Delta P$$

$$q_{l,m} = q_{l-1,m} + \Delta p \qquad \text{Formula (19)}$$

In the case of the upper edge, the coordinates $q_{l,m}$ are obtained using the following Formula (20) on the basis of control point $p_{l,m+2}$ and $\Delta p$.

$$q_{l,m+1} = p_{l,m} + 2 - \Delta p$$

$$q_{l,m} = q_{l,m+1} - \Delta p \qquad \text{Formula (20)}$$

In the case of the lower edge, the coordinates $q_{l,m}$ are obtained using the following Formula (21) on the basis of control point $p_{l,m-2}$ and $\Delta p$.

$$q_{l,m-i} = p_{l,m-2} + \Delta P$$

$$g_{l,m} = q_{l,m-1} + \Delta p \qquad \text{Formula (21)}$$

FIG. 10A illustrates how the control point $p_{l,m}$ at or near the left edge of the sheet is corrected. In this example, the interval $\Delta p$ of the control points is calculated from the control point $p_{l+3,m}$ and the control point $p_{l+2,m}$ distanced away from the area at or near the left edge of the sheet. The control point $q_{l+1,m}$ obtained by correction on the basis of the interval $\Delta p$ and the control point $p_{l+2,m}$ is indicated by a grey circle. In a similar manner, the control point $q_{l,m}$ obtained by correction on the basis of the interval $\Delta p$ and the control point $p_{l+1,m}$ at or near the left edge of the sheet is indicated by a grey circle.

In step S804, in the case of the left edge or the right edge of the sheet, the alignment processing module 203 moves the target control point $p_{l,m}$ to $q_{l,m}$ and the target control point $p_{l+1,m}$ to $q_{l+1,m}$. On the other hand, in the case of the upper edge or the lower edge of the sheet, the target control point $p_{l,m}$ is moved to $q_{l,m}$ and the target control point $p_{l,m+1}$ is moved to $q_{l,m+1}$.

FIG. 10B is a diagram illustrating the arrangement of the control points after correction of the control points at or near the edges of the sheet in FIG. 10A. In FIG. 10A, the character string 'ABC' is laterally stretched, and by calculating the difference between FIG. 9A and FIG. 10A, a difference at the section of the character string 'ABC' is obtained. However, as seen in FIG. 10B with the corrected control points at or near edges of the sheet, in a case that a difference between FIG. 9A and FIG. 10B is obtained, the difference is less compared to a case of FIG. 10A.

In step S805, the alignment processing module 203 determines whether processing has been executed on all of the control points, and when the alignment processing module 203 determines that processing has been executed on all of the control points, the processing ends. When it is determined that there is an unprocessed control point, the processing proceeds to step S801.

The processing for obtaining a difference image executed by the image inspection module 205 according to the first example will now be described with reference to FIGS. 11 and 12. When alignment is performed with information in the image using the flowchart in FIG. 6 described above, at the edges of the sheet, the positions of the printed image may not match due to misalignment of print positions at or near the edges. In the processing for obtaining the difference image, at or near the edges of the sheet, the difference is calculated using an image with the vertices of the sheet aligned. Thus, at or near the edges of the sheet, a correct difference image is generated.

Figure 11:
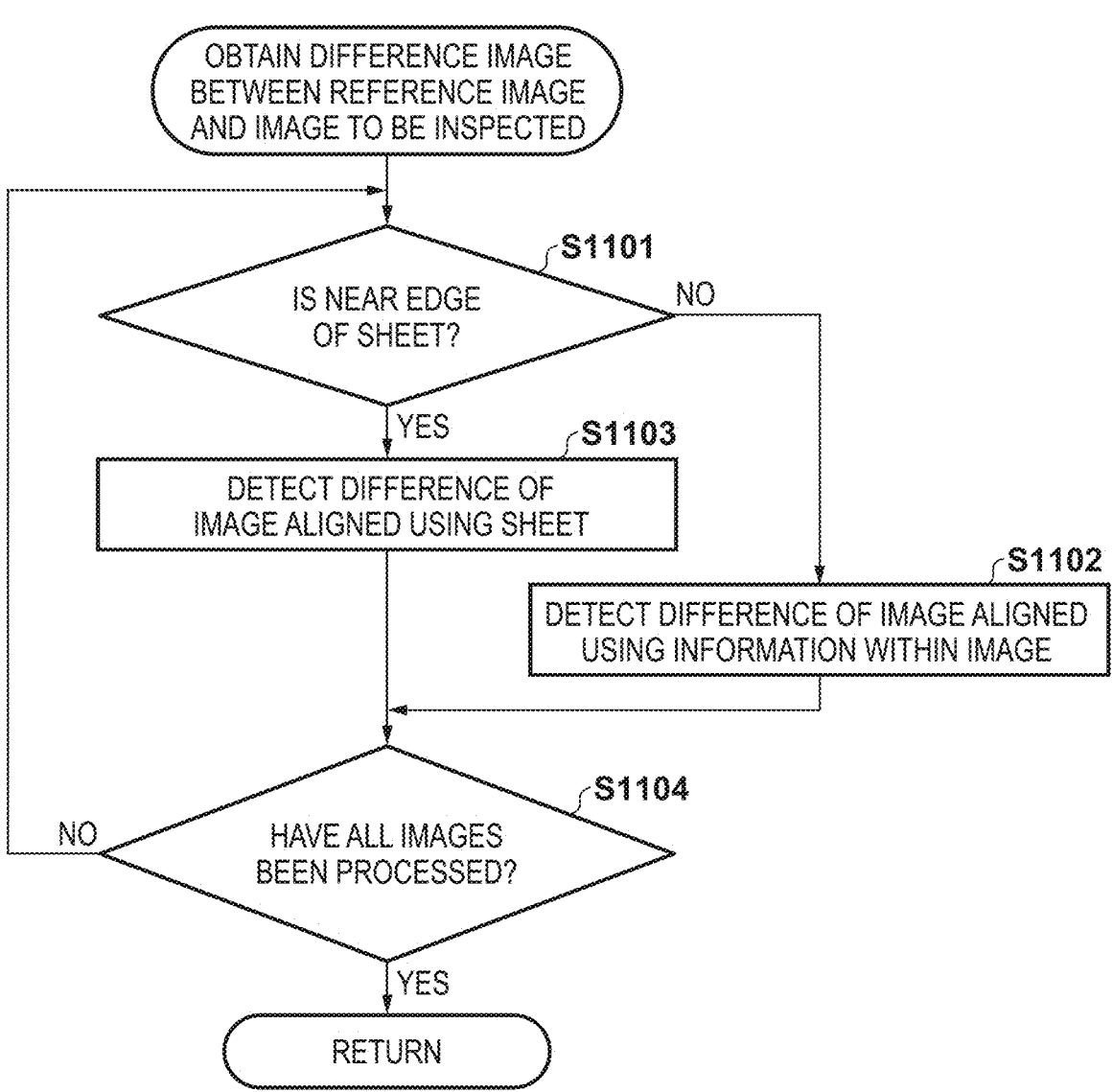
FIG. 11 is a flowchart for describing processing (step S402) to obtain a difference image according to the first example.

FIG. 11 is a flowchart for describing the processing (step S402) to obtain a difference image according to the first example. Note that in the example described using FIG. 11 also, the CPU 101 functions as the functional modules illustrated in FIG. 2.

Figure 12C:
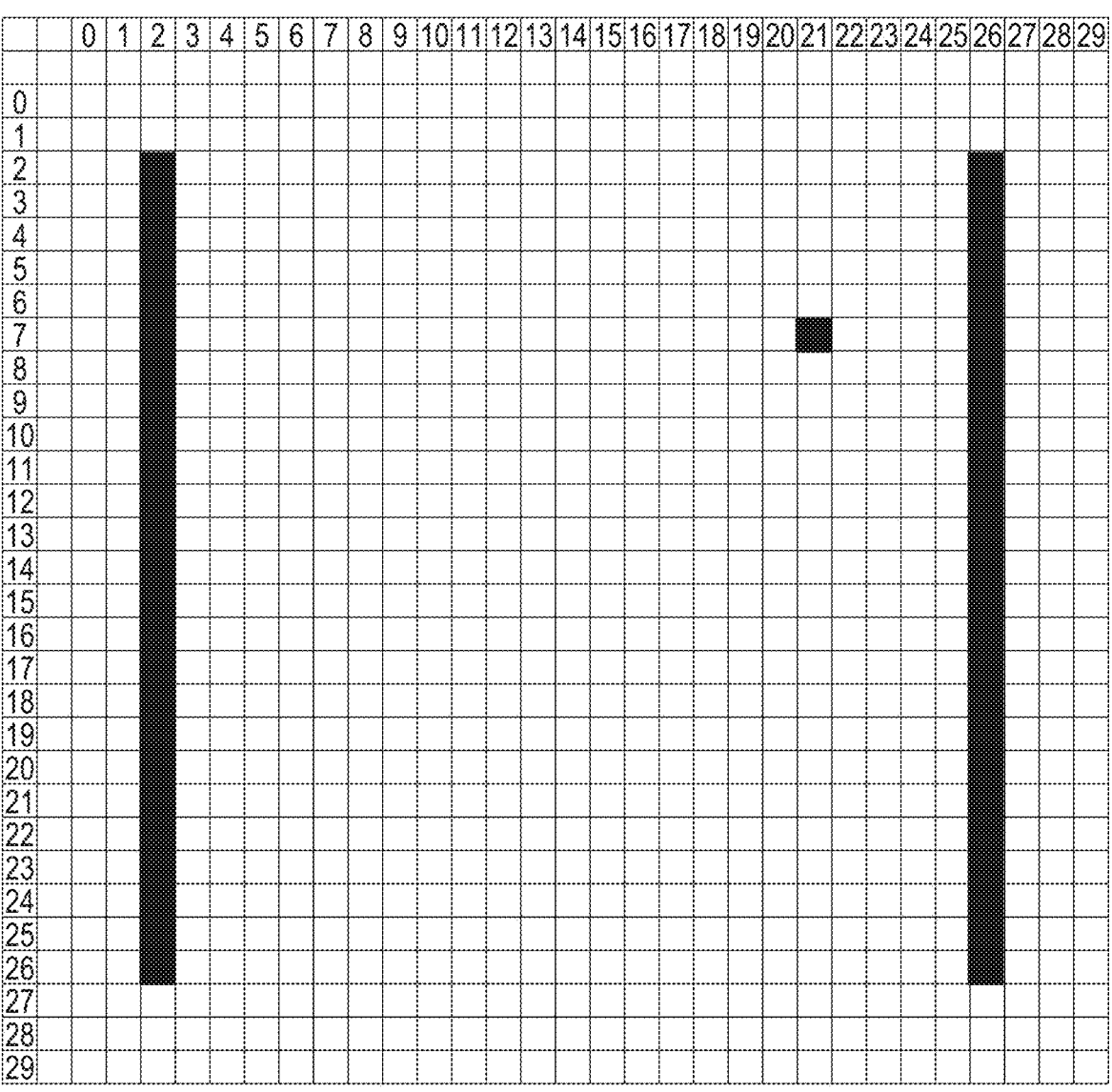

FIG. 12A illustrates an example of a reference image. The numbers on an upper end of the diagram represent the main scan direction coordinates, and the numbers on the left end of the diagram represent the sub-scan direction coordinates. In FIGS. 12A to 12F, an example using one color is illustrated. However, the image may have the three RGB colors. In the first example described herein, the white pixels in FIGS. 12A to 12F have a pixel value of 0, and the black pixels have a pixel value of 255.

FIG. 12B illustrates an example of a target image to be inspected aligned using information in the target image according to the flowchart in FIG. 6. In the illustrated case, in the target image to be inspected, the print position is offset in the left direction. The black pixel at coordinates (21,7) imitates a defect.

FIG. 12C is a difference image of FIG. 12A and FIG. 12B. FIG. 12D illustrates an example of a target image to be inspected aligned by the vertices of the sheet with respect to FIG. 12A. FIG. 12E is a difference image of FIG. 12A and FIG. 12D. Also, FIG. 12F illustrates an example of a difference image obtained according to the flowchart in FIG. 11.

First, in step S1101, the image inspection module 205 determines whether the position of the target pixel is at or near an edge of the sheet. In the first example, two pixels from the edge are considered at or near the edge of the sheet. In other words, the coordinates (3,3) in FIG. 12A are determined as being at or near the edge of the sheet. Also, the coordinates (4,4) in FIG. 12A are determined to be not at or near the edge of the sheet as they are the third pixels from the edge. Note that in the first example, the determination criterion used is whether or not two pixels from the edge is at or near an edge of the sheet. However, no such limitation is intended, and this may be set on the basis of the maximum width of the print position misalignment or the like. When the pixel is determined to be at or near the edge of the sheet in step S1101, the processing proceeds to step S1103. When the pixel is determined to not be at or near the edge of the sheet, the processing proceeds to step S1102. In step S1102, the image inspection module 205 calculates a difference FErr via the following Formula (22) using the image aligned using the image information in the target image, and the processing proceeds to step S1104. This is obtained from an absolute value of the difference between the reference image (Ref) and the target image (FTar) aligned using the information in the target image.

$$FErr(i,j)=|Ref(i,j)-FTar(i,j)| \hspace{2cm} \text{Formula (22)}$$

FIG. 12C illustrates the difference between the reference image in FIG. 12A and the target image to be inspected aligned using the information in the image in FIG. 12B. Here, the information in the target image is used in the alignment, thus it can be seen that there is no difference at the character string 'ABC' portion. Also, it can be seen that, due to print position misalignment, there is a difference from the coordinates (2,2) of at or near the edges of the sheet to the coordinates (2,26) and from the coordinates (26,2) to the coordinates (26,26). However, the coordinates (2,2) to the coordinates (2,26) and from the coordinates (26,2) to the coordinates (26,26) are coordinates at or near the edges of the sheet, and thus differences here are not used.

On the other hand, in step S1103, the image inspection module 205 calculates a difference CErr via the following Formula (23) using the target image aligned using the vertices of the sheet, and the processing proceeds to step S1104. This is calculated from an absolute value of the difference between the reference image (Ref) and the target image (CTar) aligned using the vertices of the sheet.

$$CErr(i,j)=|Ref(i,j)-CTar(i,j)| \hspace{2cm} \text{Formula (23)}$$

FIG. 12E illustrates the difference between the reference image in FIG. 12A and the target image to be inspected aligned using the vertices of the sheet in FIG. 12D. Here, the vertices of the sheet are used in the alignment, thus it can be seen that there is a difference at the character string 'ABC' portion, which is a part of the target image. However, at or near the edges of the sheet, there are no differences. This is because the vertices of the sheet are used in the alignment.

FIG. 12F illustrates an image difference obtained by the image inspection module 205 according to the first example. At or near the edges of the sheet, FIG. 12E is used, and at portions other than the portions that are at or near the edges of the sheet, FIG. 12C is used. In FIG. 12F, it can be seen that there are no excessive differences at or near the edges of the sheet and that the defect at coordinates (21,7) is correctly extracted.

At portions other than the portions that are at or near the edges, the differences for the target image to be inspected aligned using the information in the image are obtained, and at or near the edges of the sheet, the differences for the target image to be inspected aligned using the vertices of the sheet are obtained. In this manner, whether at or near the edges of the sheet or at portions other than the portions that are at or near the edges of the sheet, differences can be correctly obtained.

In step S1104, the image inspection module 205 determines whether or not the differences for all of the pixels have been obtained. When the image inspection module 205 determines that all have been obtained, the difference image obtaining processing ends. On the other hand, when it is determined that there is an unprocessed pixel, the target pixel is moved to the next pixel, and the processing transitions to step S1101.

In the first example, a difference image is obtained by switching the alignment image depending on whether or not the pixel is at or near the edge of the sheet. However, in another example, the method of obtaining the differences in an image at the edges of the sheet may include, for the portion at or near the edge of the sheet, copying the image data of around edges of the sheet and calculating the difference.

In another method, the difference calculating processing may not be executed at or near the edges of the sheet.

Next, details of when the inspection results output module 206 displays the detection results in step S308 in FIG. 3 will be described.

FIG. 13 depicts a view illustrating an example of a UI screen 1301 where the image processing apparatus 100 displays the detection results on the UI panel 108 according to the first example.

An overall image 1302 of the target image to be inspected is displayed on the UI screen 1301. In this example, a defect 1303 detected using the filter in FIG. 5A is determined to be a dot-shaped defect, and the text 'dot-shaped defect' is also displayed at or near the defect 1303. Also in this example, a defect 1304 detected using the filter in FIG. 5B is determined to be a linear defect, and the text 'linear defect' is also displayed at or near the defect 1304. Furthermore, as illustrated in tables 1305 and 1306, the positional coordinates of the detected defects may also be displayed.

However, a method of displaying the inspection results is not limited to the method described above, and a method of making which processing, from among the plurality of detection processing, has been used to detect the detected defect, for example, displaying each type of detection processing with a different color, may be used, but this method is not limited.

According to the first example described above, even when the print position is misaligned with respect to the sheet due to print position misalignment or the like, by correcting the control points at or near the edges of the sheet using information relating to the surrounding control points, at or near the edges of the sheet, highly accurate alignment can be achieved.

Second Example

In the method according to the first example described above, control points at or near the edges of the sheet are corrected. However, in the second example described herein, a method of adding control points at or near the edges of the sheet is used. In the second example, by adding control points to the edges of the sheet and to edges of a printable region, even in the case of print position misalignment, at or near the edges of the sheet, highly accurate alignment is achieved. Note that the configuration of the printing system, the hardware configuration of the image processing apparatus, and the like according to the second example are shared with the first example described above, and thus descriptions thereof are omitted. Only the differences with the first example will be described below in detail.

Alignment Processing

Next, the processing process of the alignment processing executed in step S401 in FIG. 4 by the alignment processing module 203 according to the second example will be described with reference to FIGS. 14 and 15.

FIG. 15 is a diagram illustrating an example of an arrangement of control points according to the second example.

In FIG. 15, a grey object shows an image of a sheet on which a target image is printed. A portion in the grey object surrounded by the broken line represents a printable area of the sheet. The printable area has a predetermined area. The printable area is defined as the area inward from 1.5 mm in from the edges of the sheet.

FIG. 14 is a flowchart for describing processing of the alignment processing executed in step S401 in FIG. 4 by the alignment processing module 203 according to the second example. In the example described using FIG. 14, the CPU 101 functions as the functional modules illustrated in FIG. 2.

First, in step S1401, the alignment processing module 203 performs initial alignment. Subsequently, the processing proceeds to step S1402, the alignment processing module 203 disposes the control points as illustrated in FIG. for example. Here, L x M number of control points are disposed in a grid-like pattern on the input image I. At this time, the distance δ between control points is obtained from L, M, and the image size. The coordinates of the control point at 1 row and m column correspond to $p_{l,m}$ (l=1, . . . , L, m=1, . . . , M).

Subsequently, the processing proceeds to step S1403, the alignment processing module 203 adds control points at the edges of the sheet and the edges of the printable area. In other words, the alignment processing module 203 adds a control point $r_{l,m}$ at the edge of the sheet. Here, an intersection point of an edge of the sheet and a line segment joining the control points $p_{l,m}$ and $p_{l+1,m}$ running between the edges of the sheet is obtained, and the intersection point is added as the control point $r_{l,m}$. Also, the alignment processing module 203 adds a control point $s_{l,m}$ at the edge of the printable area. In other words, the intersection point of a line segment joining the control points $p_{l,m}$ and $p_{l+1,m}$ running between the edges of the printable area and the edge of the printable area is obtained, and the intersection point is added as the control point $s_{l,m}$.

In this manner, even when there is print position misalignment, the control point $r_{l,m}$ can be aligned with the sheet edge. Also, by disposing the control point $s_{l,m}$ at the edge of the printable area, image data is ensured to not exist between the control point rl,m and the control point $s_{l,m}$. Accordingly, even when the control point $r_{l,m}$ is shifted due to print position misalignment, using the control point $s_{l,m}$, the area within the effective print region is not affected by the print position misalignment, and the target image to be inspected can be aligned with the reference image.

The processing proceeds to step S1404, the alignment processing module 203 updates the position of the control points. Subsequently, the processing proceeds to step S1405, the alignment processing module 203 performs an update of the pixels. Then, in step S1406, the alignment processing module 203 determines whether or not the update has been completed. If the alignment processing module 203 determines that the update has been completed, then the processing ends. Otherwise, the processing returns to step S1404.

According to the second example described above, by adding the control point $r_{l,m}$ on the edge of the sheet and the control point $s_{l,m}$ on the printable area, even when there is print position misalignment, the control point $r_{l,m}$ and the control point $s_{l,m}$ can compensate for this print position misalignment. In this manner, the area within the effective print region is not affected by the print position misalignment, and the target image to be inspected and the reference image can be aligned.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-087881, filed May 30, 2022, which is hereby incorporated by reference herein in their entirety.

What is claimed is:

1. An image processing apparatus that inspects an image formed on a printing medium by a printing apparatus, comprising:

one or more controllers including one or more processors and one or more memories, the one or more controllers being configured to:

read an image for inspection formed on a printing medium and obtain a target image to be inspected;

correct a position of a control point in the target image, from among control points disposed on the target image, at or near an edge of the printing medium, and perform alignment using the corrected control point so as to align the target image to a reference image using a non-rigid-body alignment; and inspect for a defect in the target image on a basis of the aligned target image and the reference image after the alignment;

wherein, in the correcting, the position of the control point at or near the edge of the printing medium is corrected on a basis of an interval between adjacent control points in the target image, at or near the edge of the printing medium.

2. The image processing apparatus according to claim 1, wherein the one of more controllers are further configured to:

align the target image to the reference image using vertices of the printing medium and vertices of the reference image.

3. The image processing apparatus according to claim 1, wherein the one or more controllers are further configured to:

set processing parameters used in the inspection, wherein the processing parameters include at least a type of the defect and a threshold for determining whether or not a defect exists.

4. The image processing apparatus according to claim 1, wherein the one or more controllers are further configured to:

in the alignment using the non-rigid-body alignment, add a control point at or near the edge of the printing medium.

5. The image processing apparatus according to claim 2, wherein the one or more controllers are further configured to:

in the inspection, obtain a difference image of the target image and the reference image after the alignment using the non-rigid-body alignment, or using the vertices of the printing medium and the vertices of the reference image, and in obtaining the difference image, obtain a difference image of the target image and the reference image after the alignment using the non-rigid-body alignment on an image portion at or near the edge of the printing medium.

6. The image processing apparatus according to claim 5, wherein the one or more controllers are further configured to:

in obtaining the difference image, obtain a difference image of the target image and the reference image after the alignment using the vertices of the printing medium and the vertices of the reference image on an image portion not at or near the edge of the printing medium.

7. The image processing apparatus according to claim 4, wherein in adding the control point, a control point is added at an intersection point of a line segment joining adjacent control points, running between the edges of the printing medium, and the edge of the printing medium.

8. The image processing apparatus according to claim 4, wherein in adding the control point, a control point is added at an intersection point of a line segment joining adjacent control points, running between edges of a printable area of the printing medium, and an edge of the printable area.

9. The image processing apparatus according to claim 2, wherein the alignment using the vertices of the printing medium and the vertices of the reference image is alignment using affine transformation.

10. The image processing apparatus according to claim 1, wherein, in the non-rigid-body alignment, the control points for controlling a shape of an image are disposed in a grid-like pattern on the target image, and positions of the control points are successively updated as the target image deforms to match a position of the target image with a position of the reference image.

11. The image processing apparatus according to claim 3, wherein the one or more controllers are further configured to:

display an inspection result from the inspection, wherein, in the display, the type of the defect and positional coordinates where the defect is detected according to the processing parameters are displayed.

12. An image processing apparatus that inspects an image formed on a printing medium, comprising:

one or more controllers including one or more processors and one or more memories, the one or more controllers being configured to:

read an image for inspection formed on a printing medium and obtain a target image to be inspected;

align the target image to a reference image;

obtain a difference between the aligned target image and the reference image;

determine whether a pixel of the target image is at or near an edge of the printing medium; and inspect for a defect in the aligned target image on a basis of the obtained difference and processing parameters, wherein, in the alignment of the target image, the one or more controllers changes methods for the alignment depending on whether the pixel of the target image is determined to be at or near the edge of the printing medium.

13. The image processing apparatus according to claim 12, wherein the one or more controllers are further configured to execute alignment using a first method in a case that the pixel of the target image exists at or near the edge of the printing medium, and execute alignment using a second method in a case that the pixel of the target image does not exist at or near the edge of the printing medium, wherein the first method includes alignment using vertices of the printing medium, and the second method includes alignment using non-rigid-body alignment.

14. The image processing apparatus according to claim 12, wherein the one or more controllers are further configured to:

set the processing parameters, wherein the processing parameters include at least a type of a defect to inspect for and a threshold for determining whether or not a defect exists.

15. The image processing apparatus according to claim 13, wherein the second method includes alignment by correcting a position of a control point at or near the edge of the printing medium.

16. The image processing apparatus according to claim 13, wherein the second method includes alignment by adding a control point at or near the edge of the printing medium.

17. The image processing apparatus according to claim 16, wherein, in adding the control point, a control point is added at an intersection point of a line segment joining adjacent control points, running between the edges of the printing medium, and the edge of the printing medium.

18. The image processing apparatus according to claim 16, wherein, in adding the control point, a control point is added at an intersection point of a line segment joining adjacent control points, running between edges of a printable area of the printing medium and an edge of the printable area.

19. A method of controlling an image processing apparatus that inspects an image formed on a printing medium, the method comprising:

reading an image for inspection formed on a printing medium and obtaining a target image to be inspected;

correcting a position of a control point in the target image, from among control points disposed on the target image, at or near the edge of the printing medium, and performing alignment using the corrected control point so as to align the target image to a reference image using non-rigid body alignment; and inspecting for a defect in the target image on a basis of the aligned target image and the reference image after the alignment, wherein a position of a control point at or near the edge of the printing medium is corrected on a basis of an interval between adjacent control points in the target image, at or near the edge of the printing medium.

20. A method of controlling an image processing apparatus that inspects an image formed on a printing medium, the method comprising:

reading an image for inspection formed on a printing medium and obtaining a target image to be inspected;

aligning the target image to a reference image;

obtaining a difference between the aligned target image and the reference image after the alignment;

determining whether a pixel of the target image exists at or near an edge of the printing medium; and inspecting for a defect in the target image on a basis of the difference obtained and processing parameters, wherein, in the aligning, a method for the alignment is changed depending on whether the pixel of the target image is determined to exist at or near the edge of the printing medium.

21. A non-transitory computer-readable storage medium storing a program for causing a processor to execute a method of controlling an image processing apparatus that inspects an image formed on a printing medium, the method comprising:

reading an image for inspection formed on a printing medium and obtaining a target image to be inspected;

correcting a position of a control point in the target image, from among control points disposed on the disposed on the target image, at or near the edge of the printing medium, and performing alignment using the corrected control point so as to align the target image to a reference image using non-rigid body alignment; and inspecting for a defect in the target image on a basis of the aligned target image and the reference image after the alignment, wherein a position of a control point at or near the edge of the printing medium is corrected on a basis of an interval between adjacent control points in the target image, at or near the edge of the printing medium.

22. A non-transitory computer-readable storage medium storing a program for causing a processor to execute a method of controlling an image processing apparatus that inspects an image formed on a printing medium, the method comprising:

reading an image for inspection formed on a printing medium and obtaining a target image to be inspected;

aligning the target image to a reference image;

obtaining a difference between the aligned target image and the reference image after the alignment;

determining whether a pixel of the target image exists at or near an edge of the printing medium; and inspecting for a defect in the target image on a basis of the difference obtained and processing parameters, wherein, in the aligning, a method for the alignment is changed depending on whether the pixel of the target image is determined to exist at or near the edge of the printing medium.

* * * * *